(12) United States Patent
Quan

(10) Patent No.: US 7,792,293 B2
(45) Date of Patent: Sep. 7, 2010

(54) METHOD AND APPARATUS FOR MODIFYING A SUBSEQUENTLY GENERATED CONTROL COMMAND IN A CONTENT CONTROL SYSTEM

(75) Inventor: Ronald Quan, Cupertino, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1493 days.

(21) Appl. No.: 11/123,826

(22) Filed: May 6, 2005

(65) Prior Publication Data

US 2006/0251252 A1 Nov. 9, 2006

(51) Int. Cl.
*H04N 7/167* (2006.01)
(52) U.S. Cl. ..................... 380/203; 380/204
(58) Field of Classification Search ......... 380/201–204, 380/210, 221, 236–238
See application file for complete search history.

(56) References Cited

U.S. PATENT DOCUMENTS

| | | | |
|---|---|---|---|
| 4,100,575 A | 7/1978 | Morio et al. | |
| 4,577,216 A | 3/1986 | Ryan | |
| 4,631,603 A | 12/1986 | Ryan | |
| 4,695,901 A | 9/1987 | Ryan | |
| 4,819,098 A | 4/1989 | Ryan | |
| 4,907,093 A | 3/1990 | Ryan | |
| 4,937,679 A | 6/1990 | Ryan | |
| 5,157,510 A | 10/1992 | Quan et al. | |
| 5,194,965 A | 3/1993 | Quan et al. | |
| 5,315,448 A | 5/1994 | Ryan | |
| 5,394,470 A * | 2/1995 | Buynak et al. | ............... 380/204 |

(Continued)

FOREIGN PATENT DOCUMENTS

CN 1127577 A 7/1996

(Continued)

OTHER PUBLICATIONS

Search Report for PCT/US2005/038711 mailed Mar. 20, 2006, 2 pages.

(Continued)

*Primary Examiner*—Gilberto Barron, Jr.
*Assistant Examiner*—Venkat Perungavoor
(74) *Attorney, Agent, or Firm*—George B. Almeida; Andy T. Pho

(57) ABSTRACT

In record or content control management systems, various selected reference, record control, copy protection or control information signals, or other signifiers, are used to identify control signals, for example, bits, to provide control of subsequent use of data, audio and video signals in the analog and digital domain. Method and apparatus are disclosed for modifying the effects of a content control system as well as for modifying an effect of a copy protection signal. To this end, the reference, record control, copy protection signals, or other control information signals, e.g., content control signals, may be modified to cause an erroneous or unintended reading subsequently of the reference or control signals which in turn correspondingly alters the control command of the record or content control system. Further, where a copy protection signal is being used as a control signal, a modification may be made to the copy protection signal to alter the subsequently generated control command while still maintaining copy protection effects in the analog domain and allowing recording in the digital domain. Also, included are unique methods for providing content control.

63 Claims, 23 Drawing Sheets

U.S. PATENT DOCUMENTS

| | | |
|---|---|---|
| 5,583,936 A | 12/1996 | Wonfor et al. |
| 5,625,691 A | 4/1997 | Quan |
| 5,633,927 A | 5/1997 | Ryan et al. |
| 5,748,733 A | 5/1998 | Quan |
| 5,907,655 A | 5/1999 | Oguro |
| 5,953,417 A | 9/1999 | Quan |
| 6,058,191 A | 5/2000 | Quan |
| 6,317,883 B2 | 11/2001 | Marics |
| 6,327,422 B1 | 12/2001 | Quan et al. |
| 6,339,449 B1 * | 1/2002 | Ikeda et al. ............ 348/463 |
| 6,349,139 B1 | 2/2002 | Quan |
| 6,381,747 B1 | 4/2002 | Wonfor et al. |
| 6,404,974 B1 | 6/2002 | Franklin |
| 6,421,497 B1 * | 7/2002 | Quan .................... 386/1 |
| 6,535,614 B1 * | 3/2003 | Kimura et al. ........... 382/100 |
| 6,539,548 B1 | 3/2003 | Hendricks et al. |
| 6,542,609 B1 | 4/2003 | Ryan et al. |
| 6,559,891 B1 | 5/2003 | Jackson |
| 6,701,062 B1 | 3/2004 | Talstra et al. |
| 6,731,758 B1 | 5/2004 | Graunke et al. |
| 6,792,538 B1 * | 9/2004 | Kuroda et al. ........... 713/193 |
| 6,826,352 B1 | 11/2004 | Quan |
| 6,848,051 B2 * | 1/2005 | Wachtfogel et al. ...... 713/181 |
| 2002/0172366 A1 | 11/2002 | Peterka et al. |
| 2003/0142959 A1 * | 7/2003 | Qu ........................ 386/94 |
| 2004/0047469 A1 | 3/2004 | Ryan et al. |
| 2004/0240846 A1 * | 12/2004 | Cookson et al. ......... 386/94 |
| 2004/0247288 A1 * | 12/2004 | Nam et al. .............. 386/94 |
| 2005/0084102 A1 | 4/2005 | Hollar |
| 2005/0111661 A1 | 5/2005 | Wijnen et al. |
| 2006/0093139 A1 | 5/2006 | Quan |
| 2006/0093140 A1 | 5/2006 | Quan |
| 2008/0309816 A1 | 12/2008 | Quan et al. |

FOREIGN PATENT DOCUMENTS

| | | |
|---|---|---|
| CN | 1181156 A | 5/1998 |
| EP | 0 224 929 A2 | 6/1987 |
| EP | 0 224 929 A3 | 6/1987 |
| EP | 0 580 367 A2 | 1/1994 |
| EP | 0 580 367 A3 | 1/1994 |
| EP | 0 580 367 B1 | 3/1999 |
| EP | 1 711 009 A1 | 10/2006 |
| TW | 501370 B | 9/2002 |
| TW | 512629 B | 12/2002 |
| TW | 548983 B | 8/2003 |
| WO | WO 01/17251 A1 | 3/2001 |
| WO | WO 01/74068 A1 | 10/2001 |
| WO | WO 02/062054 A2 | 8/2002 |

OTHER PUBLICATIONS

Eitzmann, G. (Jun. 15, 1998). "Chapter 3. Building Blocks of a Video Format," located at http://techpubs.sgi.com/library/dynaweb_docs/0640/SGI_Developer/books/VFC_PG/sgi_ht..., last visited Jul. 6, 2004, 13 pages.

Gray, Peter. (Mar. 16, 2003). "Tri-level Synch Issues on the Set," located at http://jkor.com/peter/trilevel.html, last visited on Jul. 6, 2004, 11 pages.

HDTV.Net. (Date Unknown). "Local High Definition Information," located at http://www/hdtv.net/, last visited on Jul. 20, 2004, 1 page.

National Broadcast Corporation. (Date Unknown). "NBC & High Definition Television," located at http://www.nbc.com/nbc/footer/HDTV.shtml, last visited on Jul. 20, 2004, 2 pages.

Texas Instruments Incorporated. (Date Unknown). "TI Introduces First HDTV Compliant Digital-to-Analog Converters; Automatic Tri-level Sync Pulse Generation Eases Design and Brings HDTV Products to Market Faster," located at http://www.pmewswire.com/cgi-bin/stories.pl?ACCT=104&STORY=/www/story/03-29-19..., last visited on Jul. 6, 2004, 3 pages.

* cited by examiner

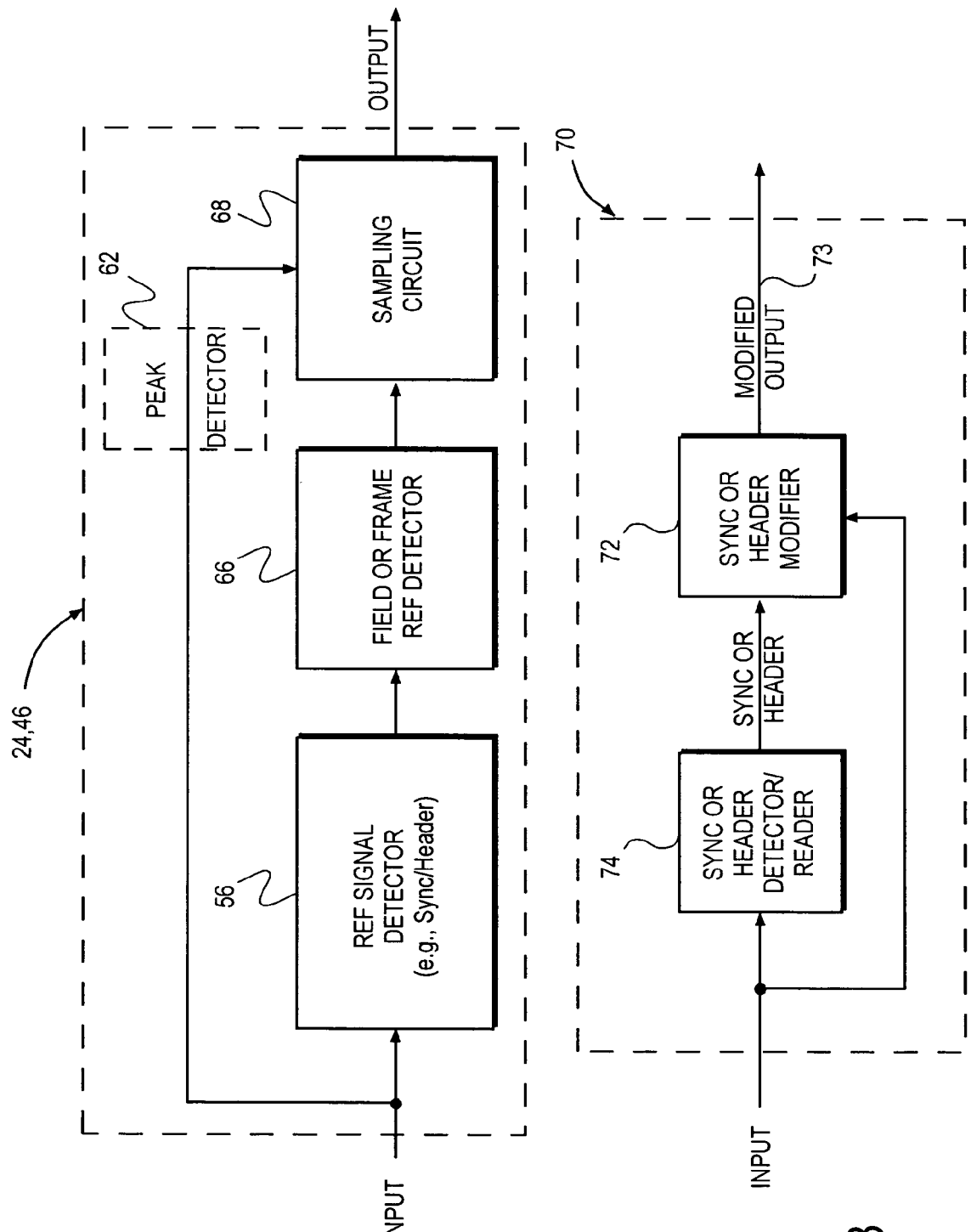

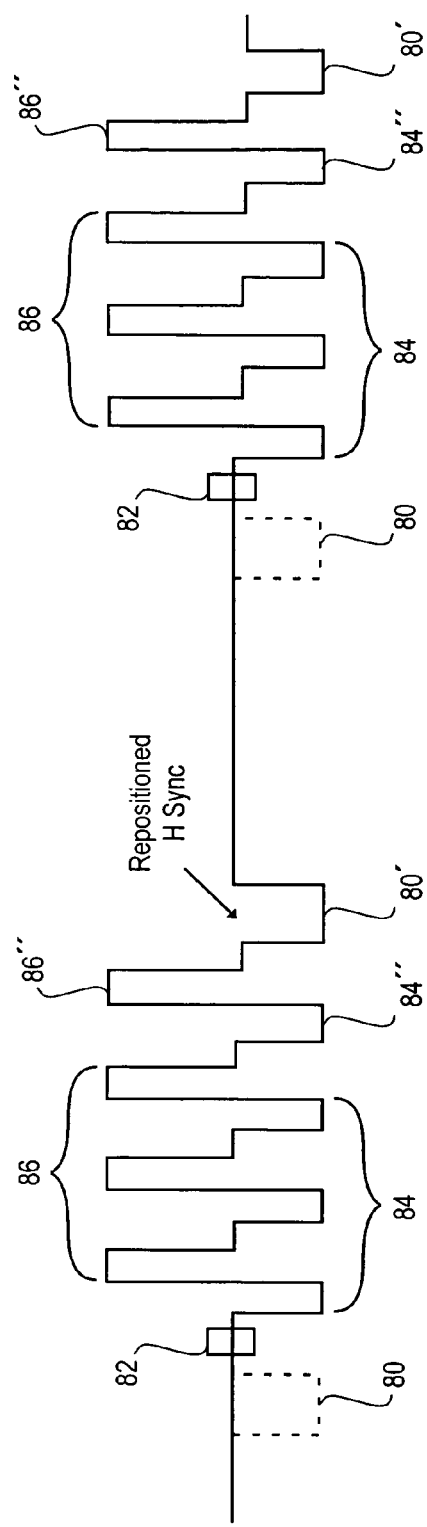
FIG. 4F
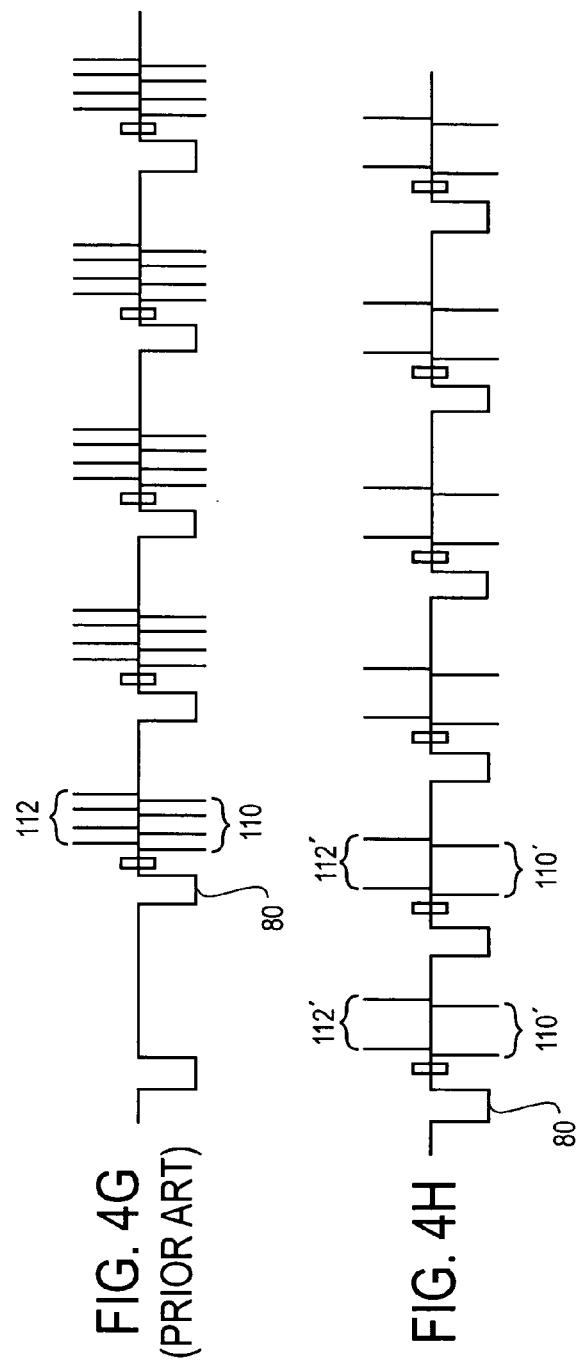
FIG. 4G (PRIOR ART)
FIG. 4H

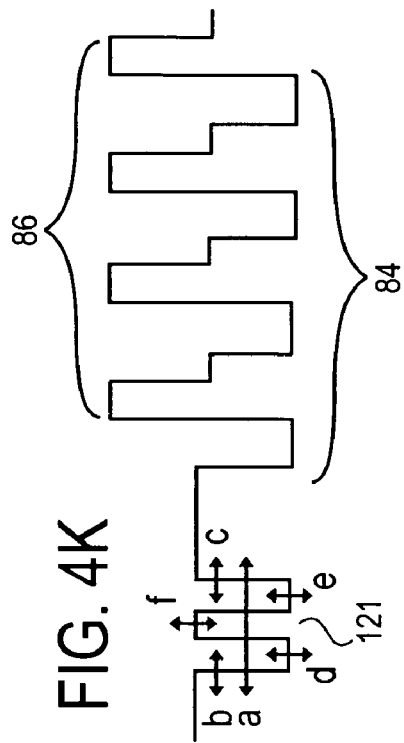
FIG. 4K
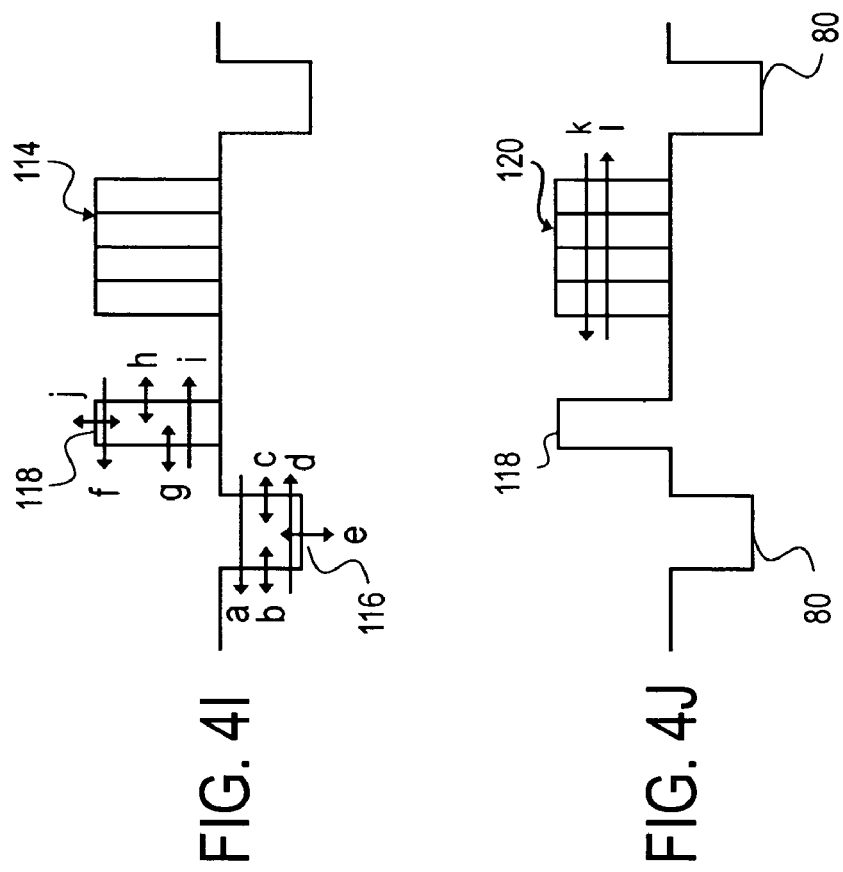
FIG. 4I
FIG. 4J

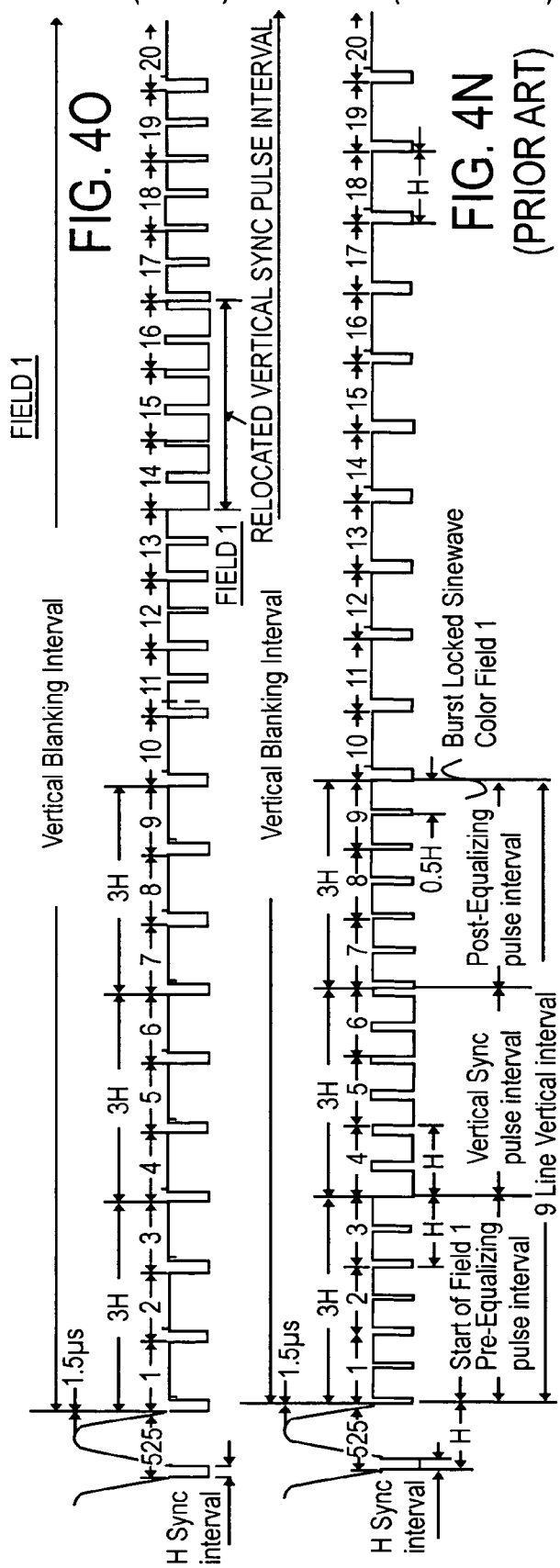

FIG. 5 (PRIOR ART)
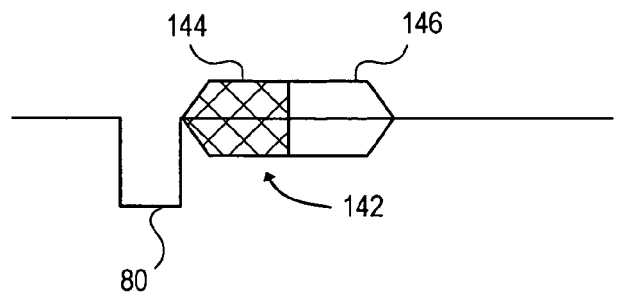
FIG. 5A
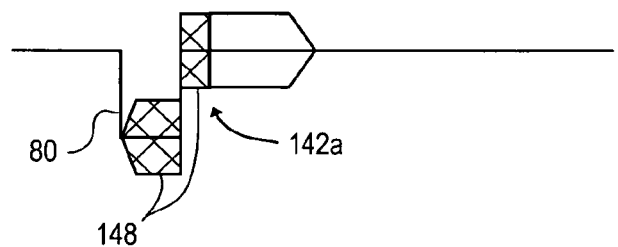
FIG. 5B
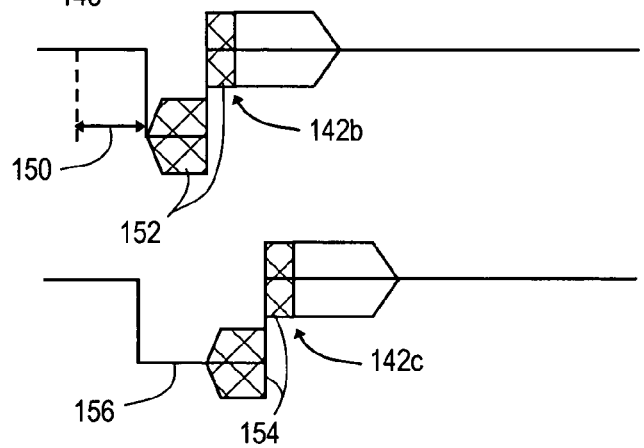
FIG. 5C
FIG. 5D
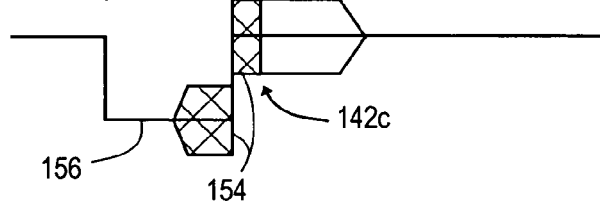
FIG. 5E
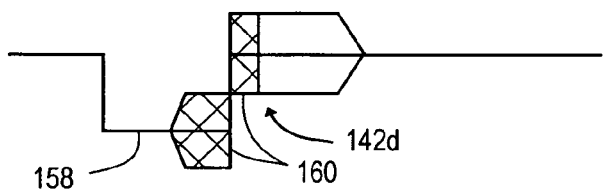
FIG. 5F
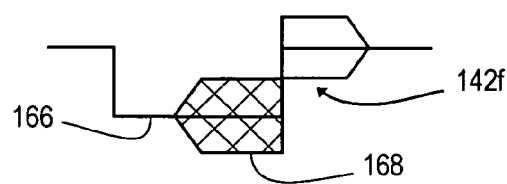

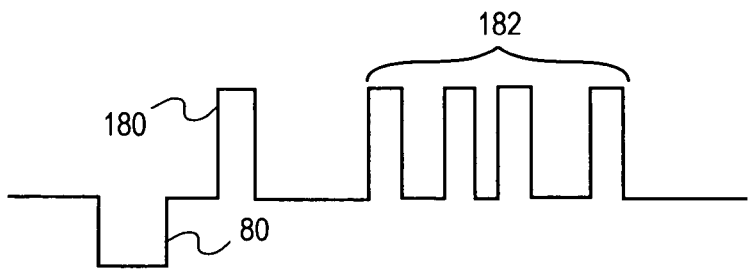
FIG. 6
(PRIOR ART)
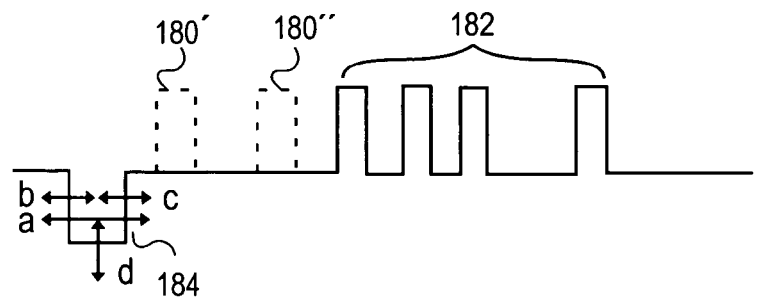
FIG. 6A
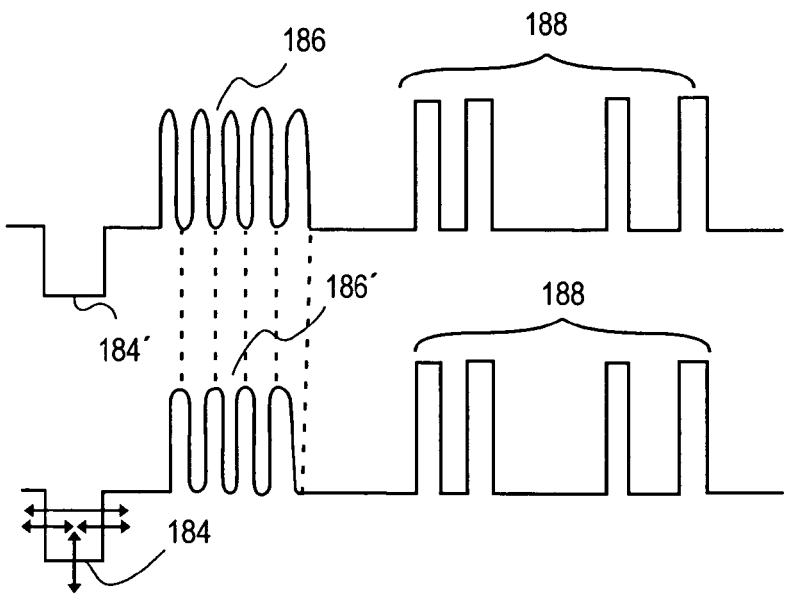
FIG. 6B
(PRIOR ART)
FIG. 6C
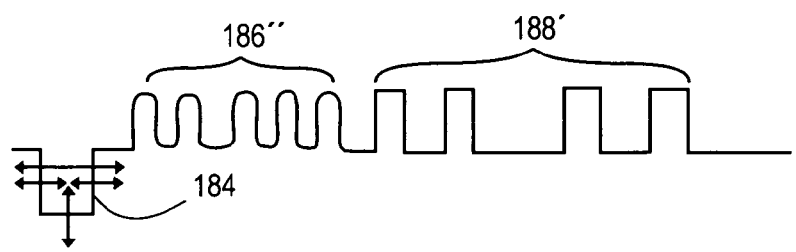
FIG. 6D

METHOD AND APPARATUS FOR MODIFYING A SUBSEQUENTLY GENERATED CONTROL COMMAND IN A CONTENT CONTROL SYSTEM

The present invention relates to copy protection and control command systems and more particularly to various techniques for modifying or otherwise altering a control command in a content control system when processing a program signal such as a data, audio or video signal. The content control system may include a management system comprising any combination of a record, distribution, transmission, display, playback, or signal transfer system.

BACKGROUND OF THE INVENTION

By way of example, there are basically two approaches which are used to circumvent piracy of data, video or audio program material. One approach is to apply an anti copy protection signal to the program material so that a recorder, such as a video cassette recorder (VCR), will produce a generally unsatisfactory picture. The other approach is to apply a copy protection information signal or a content control signal which controls, for example, a compliant recorder, to determine whether a recording is allowed or not and, if allowed, the number of copies, the duration of copying, other conditions and or restrictions which may be applied, etc.

Content control systems such as those used in the recording, displaying and or distribution of program material, rely on various content control bits or signals to provide subsequent control command functions for restrictions on, or authorizations of, program use. Such restrictions may be for example, copy never, copy once, copy for a selected duration, copy allowed, display, transmission or distribution, allowed or not, etc.

It should be noted that a copy protection signal can serve as a copy protection information signal for a record and or a content control system. In some cases, at least a portion of a copy protection signal, for example, pseudo sync and or automatic gain control (AGC) pulses, is sensed by a recorder or other compliant device, and "permission" to record, not record or provide some other function, is then dictated. In some cases a weakened, modified or derived copy protection signal, or portions thereof, which may have a reduced copy protection effect, may be used for content control or management.

On the other hand, not all copy protection information signals may serve as a copy protection signal. There are some copy protection information signals that are in the form of standard data or test signals in the vertical blanking interval. One such data signal is a copy generation management system (CGMS) signal which may comprise a series of positive-going pulses generally located in the vertical blanking interval (VBI) or overscan region. These data signals do not affect non-compliant recorders such as an off the shelf consumer VCR or VHS recorder. However, these data signals will affect a compliant recorder specifically made to receive and interpret the data or copy protection information signal and which then can provide a control command which may be used to effect selected copy protection conditions or other functions.

By way of further example, a content control system may use, as control commands, copy protection signals such as color burst phase modifications (CS), automatic gain control pulses (AGC), and or pseudo sync pulses (PS). Depending on the properties or combinations of any of these copy protection signals, a content control system is established with various properties. As a simple example, one can define the following:

a) If AGC pulses are off and CS is off, then copying or distributing is allowed.

b) If AGC pulses are on and CS is off, then copying or distributing is allowed for a duration.

c) If AGC pulses are on and CS is on, then recording or distributing is not allowed.

In the case of the color burst phase modifications (termed "color stripe" or CS), the signals to be detected can be for example of a 2 line or 4 line type, meaning there are color stripe signals in two lines out of m lines or in four lines out of m lines. In this situation, a 2 line CS copy protection signal may form one control command while a 4 line CS copy protection signal may form a different control command.

A content control system includes a compliant device adapted to receive signals and interpret these signals as control commands such as illustrated above. For example, a compliant device may be a personal video recorder (e.g., personal video recorder [PVR], Tivo, or RePlay recorder, trademarks of Tivo Inc. and D&M Holdings, Inc. respectively), a digital videodisc recorder (e.g., digital video disc [DVD] recorder), a video to digital translator unit such as a video to USB or IEEE1394 adapter, a video to wireless transmitter (e.g., video to WiFi or the like), etc.

It is to be understood that a compliant device is a device which includes reader or detection circuitry which is designed to recognize particular signals, that is, which interprets the signals (pulses), and provides a corresponding control, that is, a control command, based on the particular signals. For example, a reader may receive information via analog or digital signals or embedded signals. After information is received, a "judgement" or "interpretation" (e.g., command) is made by a content or record control system. A reader may be implemented in any combination of an analog circuit, a digital circuit, and or software. In many instances, a reader relies on reference signals to locate a content control signal or a data signal, which provides information to a content control or record control system. In another instance, the information signal may be embedded into the program content. One such example of embedding is using a watermark waveform or signal added or inserted to a program signal such as a video or an audio or a digital signal. In an example with an embedded signal, a reader then would retrieve information from a watermark for (e.g., producing a command to) a content control or record control system.

An example of a content control system is disclosed in a (copending) U.S. patent application Ser. No. 10/753,844, filed Jan. 7, 2004, to Mark A. Hollar, entitled METHOD AND APPARATUS FOR CONVEYING RIGHTS ACROSS AN ANALOG VIDEO INTERFACE, and assigned to the same assignee as this application, and which is incorporated herein by reference. Another example of a content control system is disclosed in a (copending) US Patent application Ser. No. 60/623,297 filed Oct. 28, 2004 to Ronald Quan, entitled CONTENT MANAGEMENT FOR HIGH DEFINTION TELEVISION, and assigned to the same assignee as this application, and which is incorporated herein by reference.

SUMMARY OF THE INVENTION

The present invention provides method and apparatus for at least modifying an effect or feature, for example, a control command, of a content control system. The content control system may include a management system comprising a record, distribution, transmission, display, playback or signal transfer system, or any combination of the systems. By way of example, the record system may include a PVR or DVDR, the distribution system may include an Ethernet or IEEE 1394 link or the like, the transmission system may be a (cable) broadcast or a wireless system such as WiFi or an optical transmitter, the display system may be a television (TV) set or computer monitor, and the playback system may be a DVD player or iPod (trademark of Apple Computer, Inc.).

In one embodiment, the present invention provides a method and apparatus for modifying the effects of a recording system, which relies on record bits (e.g., tag(s) or broadcast flag(s)) or copy protection signals (e.g., CS modifications, AGC and or pseudo sync pulses) or other signifiers, for record control.

In another embodiment of the invention, reference signals such as the horizontal sync or vertical sync pulses located prior to or after the record bits, copy protection signals or other control information signals (e.g., broadcast flags or flags) are modified, leaving the actual record bits or copy protection signals substantially untouched. Because at least a portion of the reference signal is modified, the content control system does not correctly detect the record bits, copy protection signals or other control information signals, whereby copying, distribution, displaying, etc. may be allowed. In yet another embodiment of the invention, adding or inserting an interference or sync like signal to a portion of the data, audio, and or video signal may also change a subsequent control command in a record and or content control system. The interference or sync like pulse may comprise for example a jamming signal or an added pulse that resembles a pseudo sync pulse, a horizontal sync pulse, and or a vertical sync pulse, and which may include a horizontal (H) pulse, a vertical (V) pulse, a serration pulse, an equalizing sync pulse, or a pseudo sync pulse.

By way of illustration of an embodiment, a record control system utilizing pseudo sync and or AGC pulses, may have one or more horizontal sync pulses selectively modified such that a subsequently generated control command does not provide its intended function, thereby causing the content control system which generates the control command to be unreliable. An example of such an embodiment simply removes a sufficient number of horizontal sync pulses associated with the line locations of the pseudo sync and or AGC pulses thereby altering the respective content control signal, which in turn alters the subsequently generated control command. This causes an unreliable detection of the pseudo sync or AGC pulse which is normally sensed after detecting a prior horizontal sync pulse in the record control system. In this example, the altered control command thus may cause a corresponding loss of copy control, thereby allowing the recording of a watchable copy or otherwise modifying the effects of the record control system.

Another embodiment of the present invention provides for modifying at least a portion of a reference signal that accompanies a copy protection information signal or copy protection signal. This in turn modifies the corresponding content control signal, whereby the subsequent detection of the copy protection information signal or copy protection signal provides a correspondingly modified or altered control command. The resulting altered or incorrect detection, for instance in a compliant device, may allow the unauthorized distribution, displaying, playing or recording of the program material. Such program material may be in the form of video, data, or audio information. In addition, as previously mentioned, the compliant devices may include a recorder or hardware (e.g., VCR, PVR, DVR, analog recorder, digital recorder, set top box, or computer interface card or part of a computer or equivalent), a display, a video or audio signal to data convertor (e.g., analog video to IEEE 1394, USB, SDI, DVI, or the like), data to analog convertor (e.g., USB, IEEE 1394, SDI, DVI, or the like to analog video or audio, digital input recorder with analog output(s), digital set top box, computer interface card or equivalent).

The implementation(s) or method(s) of modifying at least a portion of the reference signal of previous mention, that is, for modifying an effect of a content, record, play or management system, or for modifying an effect of a copy protection signal, may be accomplished via hardware and or software.

A further embodiment of the present invention provides for altering a control command subsequently read or detected in a copy or content control system that applies a copy protection signal, or a content control signal, to the output of a compliant device upon detection of copy control information or copy protection signals. By altering at least a portion of a reference signal, the intended function of the subsequently generated control command, namely the application or insertion of a copy protection signal, or of a content control signal, in the signal which is output from the compliant device, is reduced or otherwise altered. For example, a DVD player/recorder that receives copy control bits will not be able to turn on copy protection if a portion of the reference signal is previously modified or deleted in accordance with the invention.

An example of the latter embodiment can be the simple modification of associated horizontal sync pulses located prior to pseudo sync pulses. A typical detection scheme in a compliant device of a content control system may rely on a horizontal sync pulse located prior to the pseudo sync/AGC copy protection signals to provide sampling or sensing of the pseudo sync and or AGC pulses. If sufficient numbers of horizontal sync pulses are altered (e.g., attenuated, narrowed, shifted, and or deleted), then the sampling of the copy protection signal will be impaired. For instance, removing or shifting horizontal sync pulses that are located prior to pseudo sync (and/or AGC pulses) is a sufficient alteration to allow a compliant DVD recorder to allow recording. In this example, pseudo sync and AGC pulses are still intact enough to provide a copy protection effect on a VCR.

Thus, modification of a sufficient number of horizontal sync pulses is enough to reduce the effect of a copy protection signal in a record control system. Again, modifications can include level shifting, attenuating, time position shifting, narrowing, or adding a signal to at least a portion of at least one horizontal sync pulse so as to alter an effect of a compliant device. As previously mentioned, a compliant device may (also) include a recorder, a signal distribution system, an analog to digital convertor or a digital to analog convertor, computer, cell phone, PVR, etc.

In another embodiment of the invention, rather than modify or alter the associated horizontal sync pulses, the positions of at least one of the pseudo sync and or AGC pulses instead may be shifted. Shifting the positions of at least a portion of the copy protection signals can yield a copy protection effect for some analog recorders while still affecting, altering or modifying the intended effect of a record or content control system. Yet another embodiment may utilise adding at least an extra pseudo sync pulse in selected location(s), which causes an erroneous reading in a compliant device. It is possible to modify at least one pseudo sync pulse by way of attenuation, narrowing, level shifting, position shifting, shape modification, or the like to modify a subsequent control command in a content control system or in a compliant device.

Similarly shifting or modifying a reference signal such as for example, a sync pulse relative to a color stripe copy protection (information) signal can affect the compliant device or can affect (for example, reduce) the effect of a copy or content control system.

To illustrate, in a record or play control system which uses the detection of a non normal reference color burst to provide copy protection, (e.g., wherein at least a portion of the color burst exhibits a phase modulation or phase shift) the system may be altered by shifting or modifying selected horizontal sync pulses such that the record or play control system detects the non normal reference color burst incorrectly thereby altering the control command and changing the copy protection.

It should also be noted that a copy protection effect, for example, a color stripe effect, wherein at least a portion of the color burst is phase shifted or modulated, may be reduced by modifying or shifting (e.g., delaying or widening) selected sync pulses such as the horizontal sync pulses described in the previous paragraph. Alternatively, a color burst which has had at least a portion of the color burst changed in phase, may be advanced toward the horizontal sync pulse to modify the subsequently generated control command, which in turn modifies at least an effect of the associated content or record control system.

Yet another embodiment of the invention utilizes a copy protection system in which play or record tags are inserted (generally) outside the viewable area of a video display. By modifying at least a portion of a sufficient number of sync pulses associated with the tags, the play or record control system is affected. For example, if pulses or signals are added to selected lines in the vertical blanking interval (VBI) and or its vicinity, then modifying portions of selected horizontal sync and or vertical sync signals will affect the intended function of the play or record control system.

In a further embodiment, certain data signals such as for example Copy Generation Management System (CGMS) or content control signals, may be affected by altering at least a portion of an associated vertical sync signal, such as by adding a fake vertical sync signal or by relocating at least a portion of the original vertical sync signal. A subsequent "erroneous" detection of the vertical sync signal generates an altered control command which will cause a content control system to "look" in the wrong video line for the data signal. It follows that the detection of such an erroneous line location generally indicates that the CGMS or content control signal may not be present.

Still further alternative embodiments of the invention comprise altering at least a portion of a reference start bit, a start pulse, a clock cycle or a television sync pulse in a data signal, or adding an erroneous signal waveform to the data signal. Of course, at least a portion of the data or content/record control signal may be shifted in position or location (e.g., to another pixel, line, field, or frame) to cause an altered command in a content/record control system. One example would be to move the data or content/record control signal such as a CGMS signal or the like to another location relative to a vertical sync and or a horizontal sync signal to affect a command in a content control system. In another instance, the presence of a CGMS signal or a data signal or a reference signal or a reference level or a sync signal is changed to alter a content control command. The above methods can be used to alter for example a CGMS or content control signal and thus to alter or reduce an effect of a management control system.

It should be noted that selected embodiments of mention above may be used to lessen the effects of a correspondingly modified color burst protection process.

In another embodiment wherein an N line color stripe process is detected to provide a control management system, it is possible to cause disruption by changing the number N to some other number (for example, changing the color stripe pattern). Such a change would yield a color stripe process that subsequently is not recognized correctly by the reader or detector in the control management system. It should be noted that some of these modifications may actually increase or substantially maintain the effectiveness of copy protection in analog recorders, but may allow recording, distribution, transmission or display in record or content control systems.

In still another embodiment of the invention, modifications to analog copy protection signals, which may still yield a copy protection process, may be implemented whereby content control systems will allow recording. For example, if the content control system is adjusted to sense a raised back porch pulse above 60% white level, a simple attenuation of the raised back porch to 50% would allow recording in a record or content control system, but an analog recorder would deliver a less than acceptable or normal recording.

In another embodiment, wherein AGC pulses or positive going pulses of a copy protection signal are amplitude modulated to convey information in a content control system (which pulses also may cause dynamic copy protection effects in a recorder) the pulses may be replaced with one or more static (AGC) pulses. Such a replacement of pulses will disrupt the control information, e.g., the content control signal, supplied to a content control system, which will alter a corresponding control command generated in the system. The replacement or modification also may reduce the dynamic copy protection effects on a recorder or a display device (TV set).

In still another embodiment of the invention, wherein a watermark is used to convey control management information, the watermark may be affected by applying a single band, a multiple band or a wide-band coring process. For example, a single or multi-band coring process similar to that disclosed in U.S. Pat. No. 6,349,139 to R. Quan may be used to minimize the loss in picture quality, while causing the cored watermark to be read with modified, results, that is, unintended, unreliable or erroneous results, such as derived via an altered control command.

In a further embodiment, level shifting or other modifications may be applied to at least a portion of one or more back porch pulses (bpp), sync pulses, pseudo sync pulses, positive going pulses in the horizontal blanking interval (HBI) or its vicinity, and or AGC pulses, to modify or otherwise alter a subsequent resulting control command in a record or content control system. These modifications may or may not reduce the effects or effectiveness of an analog copy protection system.

Still other embodiments of the invention include techniques which modify selected digital or RF reference signals, including for example color stripe type color burst signals or portions thereof, or which modify at least a data bit or signal portion of a record or content control system to thereby modify the results or effects of a content control system.

There are other embodiments of the invention which include unique methods for reducing at least an effect of a copy protection signal for a copy control system and/or for a recorder. One such method modifies a color stripe type color burst used for copy protection and or content control. For example if the position of either or both the sync pulse or color stripe burst (which may include a split color stripe/color burst) are shifted, the copy protection effects are reduced and or the subsequently generated control command of the content control system is altered. It follows that the control command fails to perform its originally intended function.

Yet another embodiment employs a dynamic copy protection process, such as modulating selected video lines to create at least a dynamic copy protection effect and or to create a corresponding content control signal. By altering or reducing the modulation effect, the dynamic copy protection effect is reduced, or the control command in a content control system is altered.

As an example of the latter embodiment which uses AGC or positive going pulses, the AGC pulses are amplitude modulated, or may be position, pulse-width, phase or frequency modulated, with an optional additional amplitude modulation, for copy protection and or content control purposes. A method of reducing the copy protection effect(s) or to alter the control command of a content control system is to replace the modulated AGC or positive going pulses with static modulation, that is, non-varying or constant amplitude. As a result, the modulating copy protection effects will be reduced, and or the content control system will have an altered control command. Similarly, if modulated negative going pulses are used in a content control system, at least one of the negative going pulses may be modified or replaced with a static negative going pulse.

Alternatively, it is possible to modulate at least a selected portion of the data, audio and/or video waveform to change a control command in a content control system. For example a further modulation of modulated AGC pulses (or of pseudo sync or sync pulses) can cause a compliant device to misread the proper information, which would lead to an erroneous (e.g., unintended) subsequent control command. Furthermore, modulating an active video portion with a signal may cause a watermark reader to retrieve information unreliably thereby causing an altered control command for a content control system utilising watermarks.

BRIEF DESCRIPTION OF THE DRAWINGS

FIGS. 2E, 2F, and 2G are block diagrams illustrating, by way of example, various prior art methods of detecting a content control or record control signal.

FIG. 3 is a block diagram illustrating an environment of a reference signal modifier system such as a sync/header signal modifier which cooperates with the invention.

FIGS. 4A to 4M and 4O illustrate alternative waveforms generated by the various embodiments of the invention depicted in FIGS. 8-16.

FIG. 4N is a waveform of a typical video signal (NTSC standard) including a vertical sync signal in a VBI in, for example, video lines 1-22.

FIGS. 5A to 5H illustrate several partial waveforms of the color stripe split burst signals for reducing the effects of a copy protection signal and or for changing a control command in a content control system.

FIGS. 6 and 6B are waveforms illustrating prior art data signals.

FIGS. 6A, 6C and 6D are waveforms illustrating several modifications made to data signals and or tag signals in accordance with the invention. Amplitude modification(s) may be included.

DETAILED DESCRIPTION OF THE PREFERRED EMBODIMENTS

Figure 1:
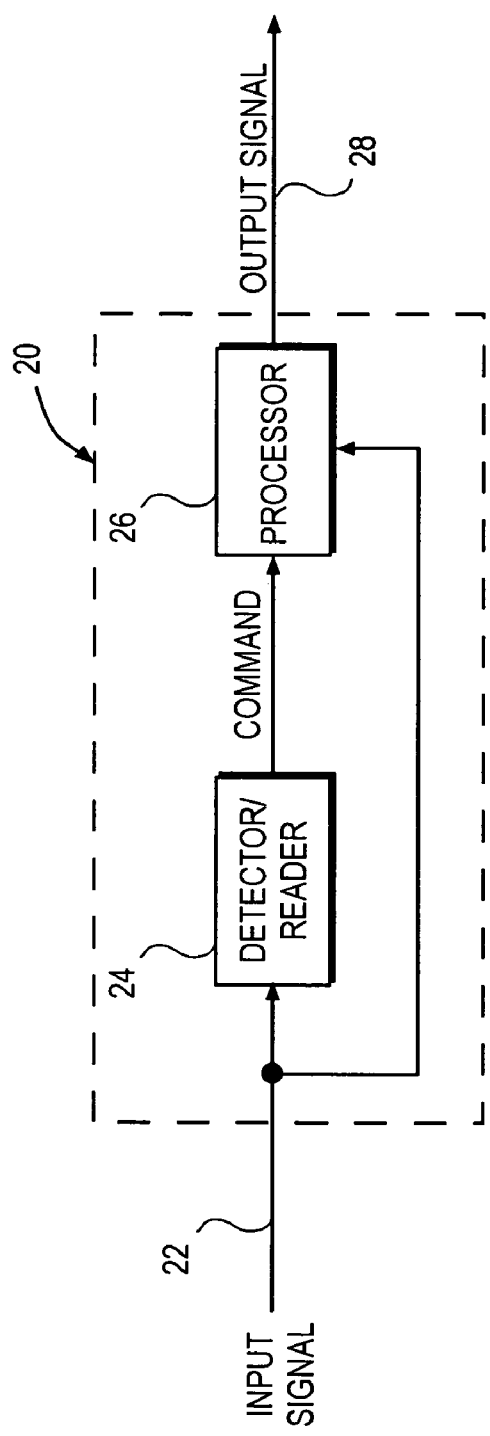
FIG. 1 is a block diagram depicting a prior art record or content control system.

Embodiments of the Invention and of Content Control Systems which Cooperate with the Invention FIG. 1 illustrates an example of a prior art content control system 20, wherein the invention cooperates with the content control system 20, as is described in detail in the following specification. An input signal such as a video, data or audio signal, is supplied on an input 22 and may contain a content control signal or a copy protection signal, or a combination of both. A detector or reader circuit 24 of the content control system senses the content control signal or copy protection signal and generates and supplies a control command to a processor system 26. The processor system 26 is usually a compliant device, which utilizes the control command to selectively process the program signal. The processor system 26 may comprise a recorder, a signal distribution device, a wireless transmitter, a signal convertor such as a video to USB or IEEE 1394 device, an accessory card or chip in a computer, a display, etc. Depending on the content control signal and the resulting control command, the processor system 26 may allow the input signal to be selectively modified, muted, passed through with an embedded content control signal or copy protection signal, etc. An output signal indicated by numeral 28, which is modified by the processor system 26, is provided on an output of the processor system 26.

Figure 2:
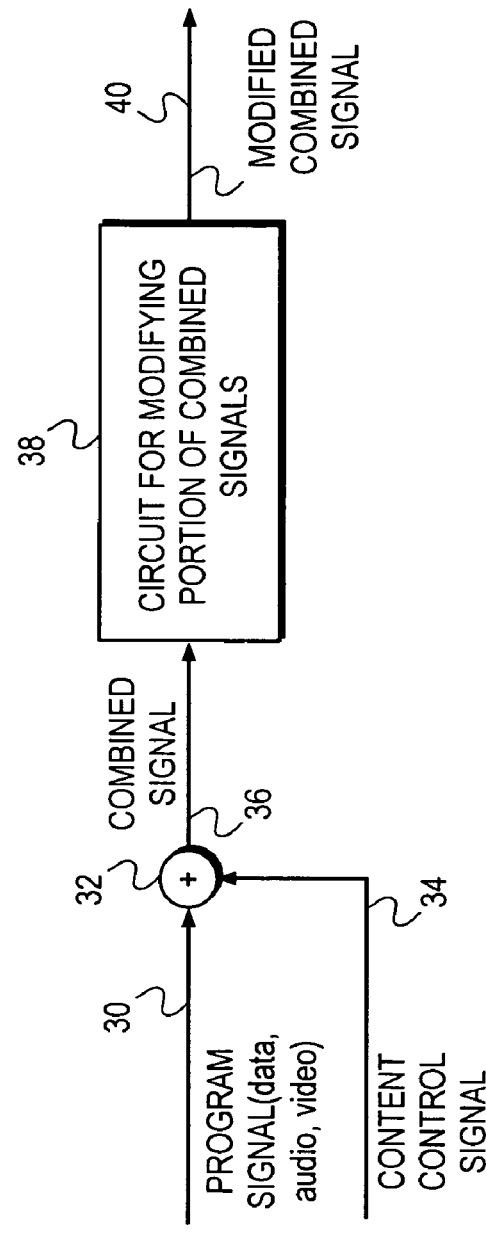
FIG. 2 is a block diagram illustrating a basic configuration of the present invention.

FIG. 2 illustrates a basic embodiment of the present invention. A program signal indicated by numeral 30 and comprising for example a data, audio or video signal, is provided on an input and is supplied to a summing or combining circuit 32. A second input of the summing circuit 32 is supplied with a content control signal indicated by numeral 34 via an associated input. The output from the summing circuit 32 on an output thereof is a combined signal 36 formed by combining, inserting or adding the content control signal with or to the program signal 30. In some instances herein, the program signal 30 may be referred to as a "selected" signal or an "input" signal.

The combined signal 36 is supplied to a modifying circuit 38 which in turn provides a selected modification to at least a portion of the content control signal, the program signal and/or a copy protection signal contained in the program signal, in accordance with the invention. Examples of the modifications are variously depicted in the waveforms of FIGS. 4 through 6D, and examples of the modifying circuit 38 of FIG. 2 are illustrated, by way of example only, in FIGS. 8 through 16. The output of the modifying circuit 38 is supplied as the program signal 30 with a modified (for example, an erroneous, unintended or unreliable) combined signal 40 on an associated output.

As further illustrated in FIGS. 8-16, the modifying circuit 38 may in general comprise selected circuits such as, for example, signal generation, attenuation, modulation, coring, inserting, interference and or reference signal modification circuits, or the like. The selected circuits modify the content control signal embedded in the program signal by the summing circuit 32, or modify a reference signal, data signal, copy protection signal contained in the program signal, or a vertical sync signal in the VBI of the program signal. It may be seen that there are a large plurality of signals which may be modified by the modifying circuit 38 in accordance with the invention, to provide a corresponding change or alteration in a copy, record or content control command subsequently generated in a cooperating content control system. Examples of such modifications are illustrated in the waveforms and circuits of the following FIGS. 4-16.

Figure 2A:
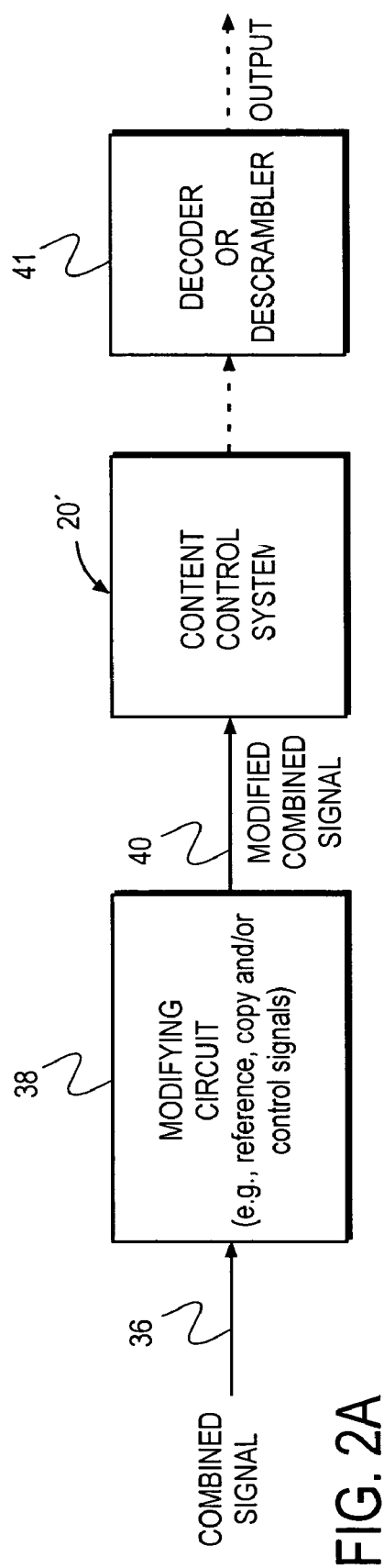
FIG. 2A is a block diagram illustrating the present invention in conjunction with a content control system for altering at least an effect or feature of the content control system, wherein at least a portion of a reference signal, a copy protection signal or a content control signal is selectively modified in accordance with the invention. An alternative embodiment featuring a watermark also is depicted.

FIG. 2A illustrates a modifying circuit 38 corresponding to the modifying circuit 38 of FIG. 2, for generating a signal 40 corresponding to the modified combined signal 40 supplied by FIG. 2. The modified combined signal 40 contains a content control signal and is supplied to a content control system 20' corresponding to the system 20 of FIG. 1. The modifying circuit 38 alters a selected portion of the input signal so as to cause the content control system 20' to generate an altered or unintended (e.g., "erroneous") control command or control function. The content control system 20' may be similar for example to the content control systems 20-20c illustrated in the following FIGS. 2C-2D.

FIG. 2A further illustrates an embodiment of the invention wherein the modifying circuit 38 modifies or alters at least a portion of a selected reference signal contained in the input signal so as to cause the content control system 20' to subsequently correspondingly alter its control command or control function.

FIG. 2A also illustrates an embodiment of the invention wherein the modifying circuit 38 modifies all or a selected portion of a content control signal, so as to subsequently alter a control command or function generated by the content control system 20'.

FIG. 2A still further illustrates an embodiment of the invention wherein the modifying circuit 38 modifies at least a selected portion or all of a reference signal and of a content control signal, so as to cause the content control system 20' to subsequently alter its control command or control function.

FIG. 2A also illustrates an alternative embodiment wherein the content control signal comprises a form of watermark embedded in the video signal and wherein the video signal, and thus the watermark is scrambled. To this end, the watermarked signal may be scrambled or encoded via the modifying circuit 38, causing the subsequent control command to be altered. To retrieve the video signal, a decoder or descrambler 41 receives and decodes or descrambles the modified video signal. This embodiment serves as a process for altering a control command or for circumventing a content control system.

Figure 2B:
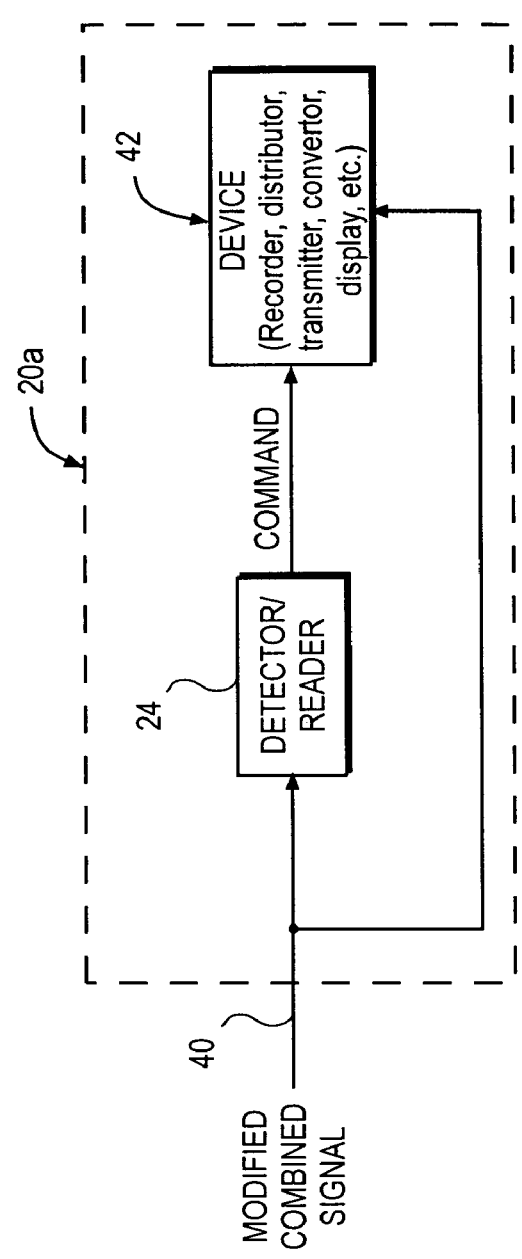
FIG. 2B is a block diagram illustrating a content control system which cooperates with the invention of FIG. 2 for controlling signal recording, distribution, transmitting, converting or displaying.

FIG. 2B illustrates an environment of a content control system 20a corresponding to the system 20 in FIG. 1. An input signal is supplied to the system 20a, which includes a device 42 such as a recorder, distributor, transmitter, converter, display, etc. The content control system 20a may represent a record control system. The input signal may comprise the modified combined signal 40 supplied via the output of FIG. 2 and thus may include a modified copy protection signal and/or a modified content control signal. The modified combined signal 40 is coupled to a detector or reader circuit 24 similar to the reader circuit 24 of FIG. 1, where the output thereof supplies a correspondingly modified or altered control command to the device 42.

Assuming that the device 42 is a recorder, the recorder can allow a recording to be made or can prohibit recording in response to the modified or altered control command. In a further example, the recorder can provide a recording and can also insert or add a content control signal and/or a copy protection signal to the recording at the output of the recorder. Depending on the modified or altered control command, the recorder may for example record an audio signal in a mono, stereo, voice quality, or high fidelity mode. The recorder also may output a video signal in various screen sizes and or resolutions as well, depending on the control command modified in accordance with the invention.

In an embodiment of the invention wherein the device 42 of FIG. 2B is a distribution or transmission control device in the content control system 20a, the modified combined signal 40 may include a content control signal or copy protection signal in the program signal 30 (FIG. 2). The distribution or transmission of the modified combined signal 40 is dependent on the modified or altered command generated by the detector or reader circuit 24, which reads the incoming modified combined signal output from FIG. 2 comprising the content control signal or copy protection signal. Depending on the corresponding subsequently generated modified control command, the distribution or transmission control system may prohibit an output, or may continue to distribute or transmit the signal 40 with or without adding a content control signal or a copy protection signal. The signal 40 may be distributed or transmitted for example with a selection of sound or video quality as mentioned in the previous paragraph describing mono, stereo, voice, high fidelity audio quality, or various screen sizes, resolutions on picture or video quality. Note that device 42 may pertain to still images or photographs.

Figure 2C:
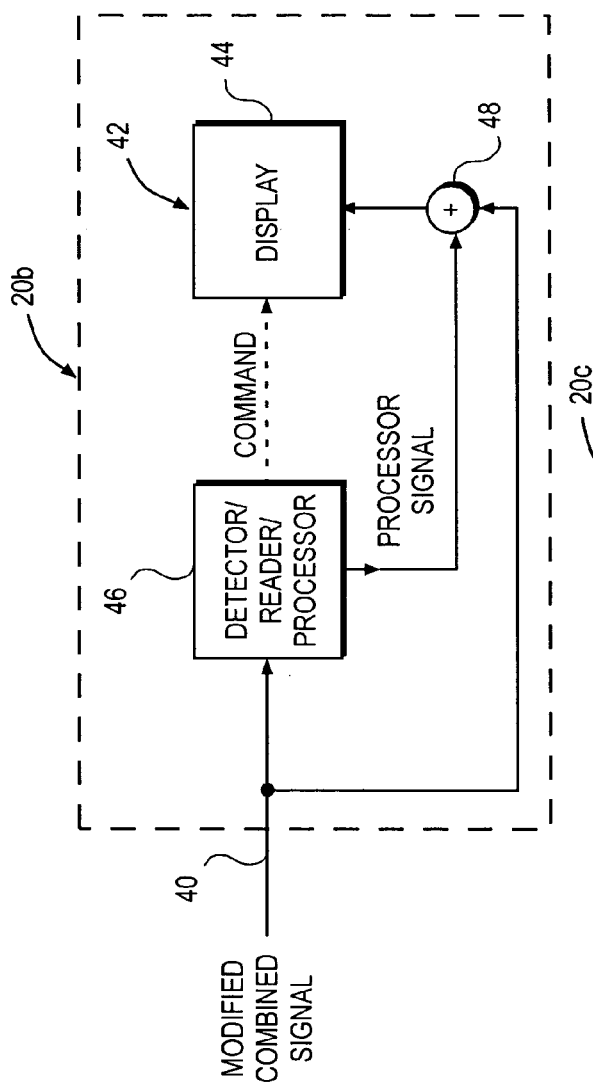
FIG. 2C is a block diagram illustrating a content control system which cooperates with the invention of FIG. 2 for providing a display.

FIG. 2C illustrates an embodiment of the invention employing a content control system 20b wherein the device 42 of FIG. 2B comprises a display device 44 in a content control system 20b. An input signal such as the modified combined signal 40 contains a content control signal or a copy protection signal, and is coupled to the display device 44 via a detector, reader or processor circuit 46. Depending on the content control or copy protection signal as previously modified by the modifying circuit 38 of the invention, one output of the detector, reader or processor circuit 46 may produce clamp error signals which are supplied to a summing circuit 48. The other input of summing circuit 48 receives the modified combined signal 40, whereupon the output thereof is a signal which provides less than optimal viewing upon display on the display device 44.

Alternatively, another output of the detector, reader or processor circuit 46 may generate and supply a control command to the display device (as shown in dashed line) to modify the viewed program (for example, to darken or tear the displayed picture, or to change resolution or picture quality of the displayed picture or photo). In a further alternative, the display device 44 may produce a viewable picture but may include a content control or copy protection signal in the (displayed) program signal at the output of the display device 44. Note that the above descriptions of FIGS. 2B and 2C also describe novel/unique methods (uses) of content control systems.

Figure 2D:
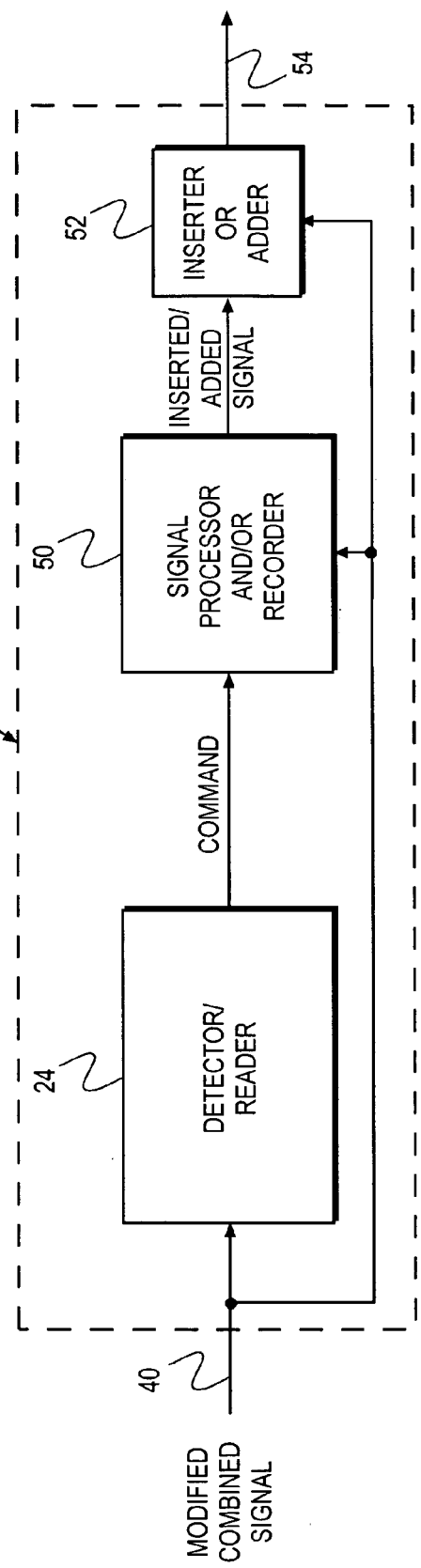
FIG. 2D is a block diagram illustrating a content control system which cooperates with the invention of FIG. 2 for redistributing a content control signal or a copy protection signal.

FIG. 2D illustrates another embodiment of the invention employing a content control system 20c wherein a control command which is modified or altered via the modifying circuit 38 of FIG. 2, can insert or add an additional signal to (e.g., an output of) a signal processor or recorder 50 via an inserter or adder circuit 52. The additional signal may be a content control signal or a copy protection signal, and the combined signals 54 are supplied via an output of the inserter or adder circuit 52.

Figure 2E:
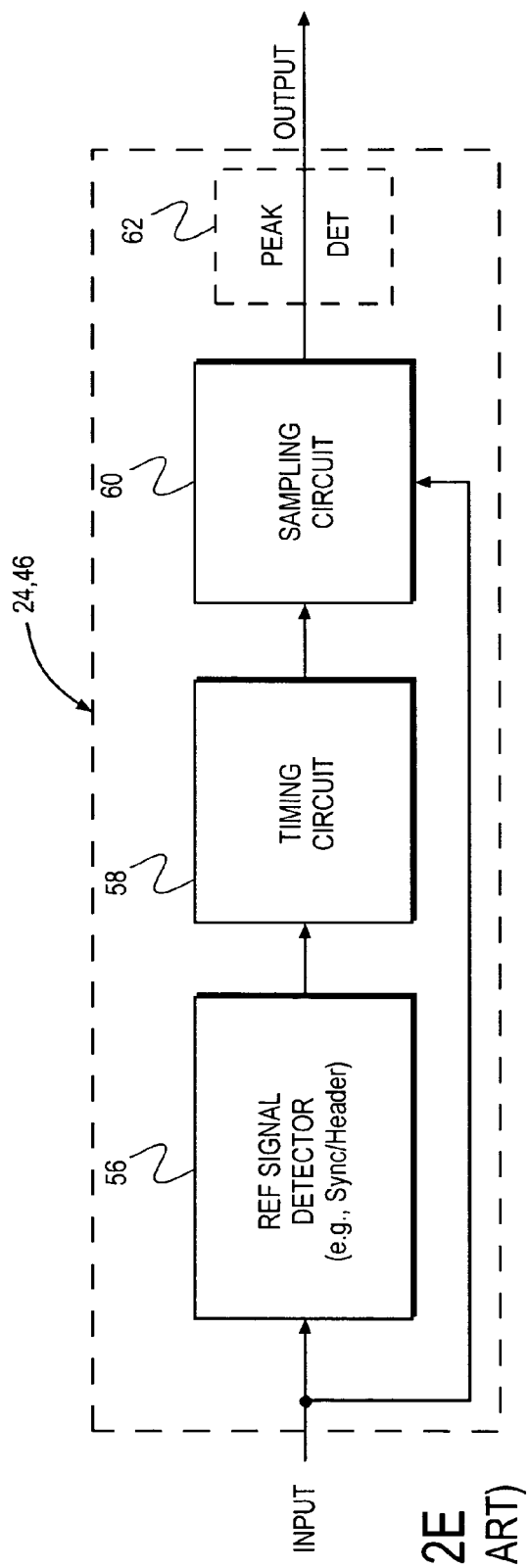

FIG. 2E illustrates by way of example, a prior art reader or detection system such as circuit 24 or 46 used in FIGS. 2B-2D, wherein a reference signal such as composite sync is detected in an input signal, such as the modified combined signal 40 of FIG. 2, via a reference signal detector 56, which can be a sync separator circuit. The output of detector 56 is coupled to a timing circuit 58 which outputs a signal coincident with at least some portion of the content control or copy protection signals. A sampling circuit 60 then samples at least some portion of the signal from the timing circuit 58, whereby the content control or copy protection signals are located. The output of the sampling circuit 60 then provides a signal indicative of the presence of the content control or copy protection signal. A peak detector 62 (shown in dashed line) may be added to hold the output signal for a selected time duration so as to provide a more usable signal indicative of the presence of the content control or copy protection signal.

For example, in FIG. 2E, if raised back porch signals are present in a video signal, the timing circuit 58 may time off a horizontal sync pulse to generate a back porch sampling pulse. The sampling pulse is supplied to the sampling circuit 60 which then outputs a signal that indicates the presence of raised back porch pulses. It should be noted that if there are horizontal sync pulses missing (e.g., due to a modification by circuit 38), then timing circuit 58 may not output a signal coincident with the raised back porch signals, thus causing the sampling circuit 60 to output an erroneous signal. A sampling circuit may also sense AGC and or pseudo sync pulses that are used for record or content control. Also, if at least a portion of an AGC or pseudo sync pulse is altered, the record or content control command is modified.

An example of the circuit of FIG. 2E is disclosed in FIG. 2 of U.S. Pat. No. 4,907,093, issued Mar. 6, 1990 to John O. Ryan, entitled METHOD AND APPARATUS FOR PREVENTING THE COPYING OF A VIDEO PROGRAM.

Figure 2F:
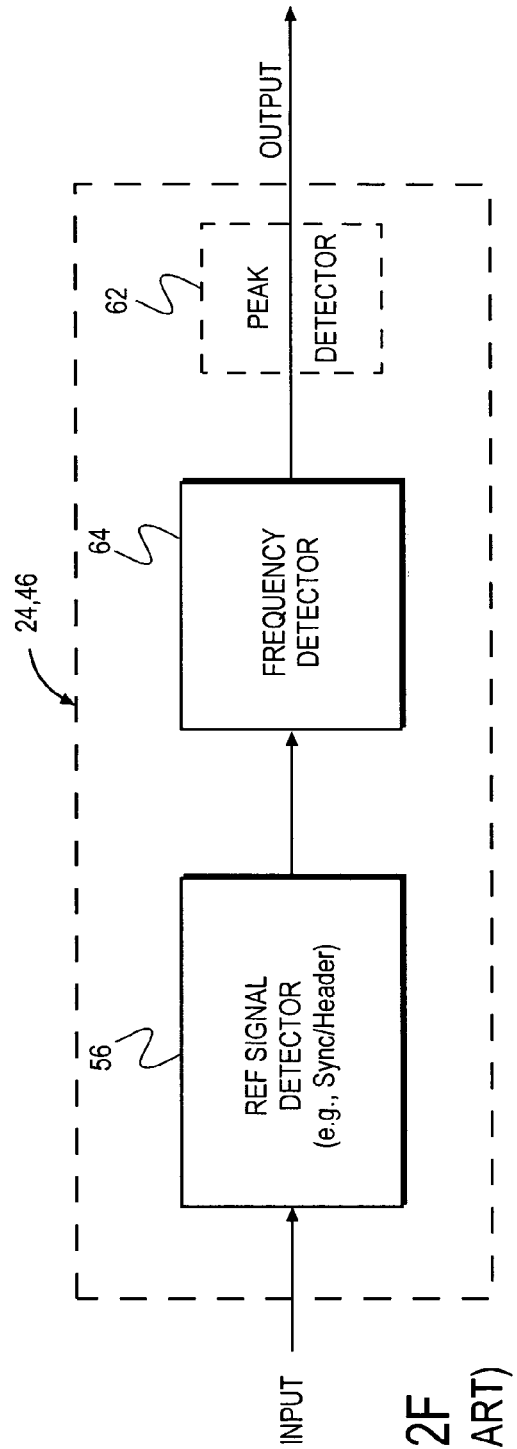

FIG. 2F illustrates a prior art method of detecting a content control or copy protection signal via a frequency detector rather than by the timing and sampling circuits of FIG. 2E. For example, some signals such as AGC pulses and or pseudo sync pulses may have a particular repetition rate. By using a frequency detector or the like, these signals may be detected. For instance, pseudo sync pulses, or some AGC pulses, generate a frequency of about 160 KHz to about 100 KHz. A reference signal generated by a composite sync separator or reference signal detector 56, when supplied to a frequency detector circuit 64, will cause circuit 64 or its peak detector 62 to output a signal indicative of a frequency in the 100 KHz to 160 KHz band. This frequency in turn indicates the presence of pseudo sync pulses in a video signal. On the other hand, normal sync pulses have frequencies of about 15.5 KHz, 32 KHz, and 50 Hz or 60 Hz. The higher frequency output from the frequency detector circuit 64 or its peak detector 62 then can provide a command for example to prohibit copying. That is, the detector circuits 64, 62 may provide a signal indicative of the presence of for example pseudo syncs, whereupon a command can be generated which in turn prohibits recording or distribution of the input signal, viz, the video signal. The frequency detector circuit 64 may comprise an FM discriminator/detector or a bandpass filter with envelope detector. Of course, any type of frequency to voltage or current converter is useable for an FM detector/discriminator. For example, a phase lock loop circuit may be used.

An example of the circuit of FIG. 2F also is disclosed in U.S. Pat. No. 4,907,093 of previous mention, in FIG. 5 thereof.

FIG. 2G illustrates a prior art detector circuit wherein selected pixels of selected video lines are sampled for an indication of the presence of content control or copy protection signals. In this example, a reference signal detector 56, which can be a sync separator circuit, receives a video signal as an input signal on its input. Detector 56 outputs a signal to a field or frame reference detector circuit 66. The output of detector circuit 66 then outputs a signal that is at least coincident to a content control or copy protection signal.

To illustrate, FIG. 2G may be used to detect AGC signals that follow pseudo sync pulses. Here, the video signal on the input is sampled at known locations of AGC pulses, whereupon a sampling circuit 68 then provides a signal indicative of the presence of the AGC pulses. Such a signal indicative of AGC pulses can be used for example, to generate a control command in accordance with the signal 36 of FIG. 2. The control command may in turn be used to prohibit recording or distribution of the video signal, etc. Similarly, FIG. 2G may be used to detect data signals such as CGMS signals or the like, which may serve as a content control signal.

An example of the circuit of FIG. 2G also is disclosed in the U.S. Pat. No. 4,907,093 of previous mention, in FIG. 6 thereof. The U.S. Pat. No. 4,907,093 is incorporated herein by reference.

FIG. 3 illustrates an embodiment of the invention which includes a modifying system 70 configured with a sync or header detector or reader circuit 74 that supplies a sync or header signal to a sync or header modifier circuit 72. Circuit 72 in turn outputs a signal 73 which is modified at selected intervals with the sync or header signal. For example, a modification to a sync or header signal can lead to an altered command in a content control system.

Figure 3A:
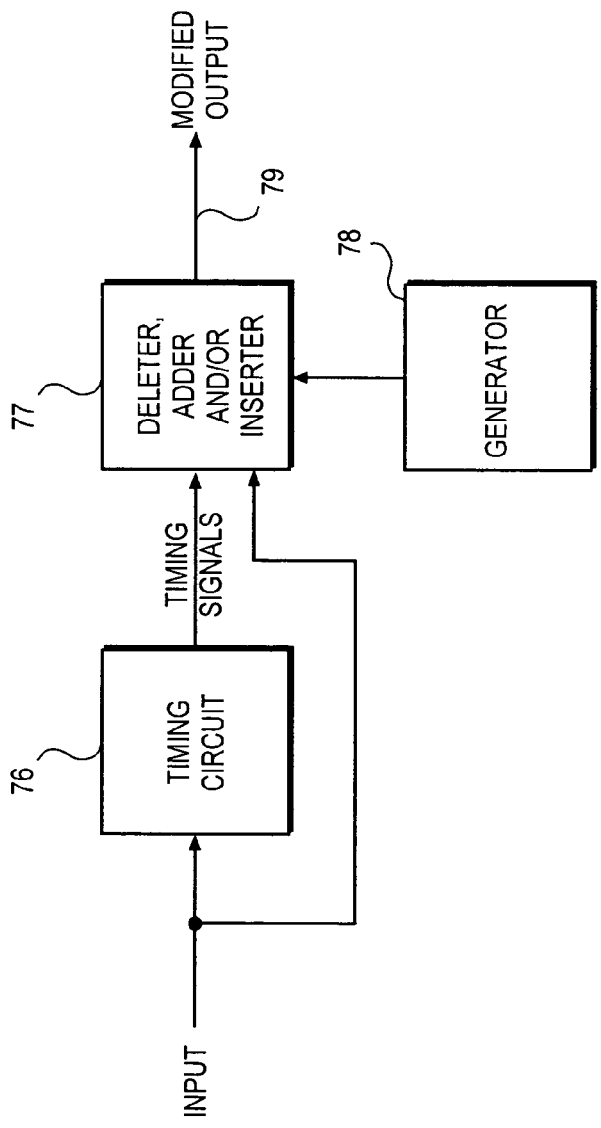
FIG. 3A is a block diagram illustrating an environment of a modifier system for adding or inserting signals and or deleting at least a portion of other signals in cooperation with the invention.

FIG. 3A illustrates an alternative embodiment of the invention wherein the input signal is supplied to a timing circuit 76 and a detector, adder and/or inserter circuit 77. The timing circuit 76 provides timing signals to the detector, adder and/or inserter circuit 77 and a generator 78 provides a selected modifying signal to circuit 77. The input signal is modified to provide a modified signal 79 by deleting a portion thereof or by adding or inserting the modifying signal from the signal generator 78 to the input signal in response to the timing signals.

Generator 78 may comprise a sync pulse generator, which may provide a sync pulse whose amplitude is detectable by a sync separator/detector circuit. The sync pulse may be an additional sync pulse located before or after a normally positioned H sync for a selected line or lines. Alternatively, the sync pulse may be an additional broad or vertical pulse/signal located before or after a normally positioned vertical sync pulse. These sync pulses may conform to or deviate from the standard (e.g., pulse widths or amplitudes) of H or V sync pulses. Also, generator 78 may add at least an extra equalizing pulse (or serration pulse or horizontal pulse or vertical pulse) of a selected pulse width (and/or of a selected amplitude) in a portion of the video signal, preferably (but not limited to) in an overscan region. Generator 78 also may change the pulse width or amplitude of one or more equalizing, serration, horizontal, and or (broad) vertical pulses as well, such as by widening or narrowing, or by amplitude variation.

Figure 4:
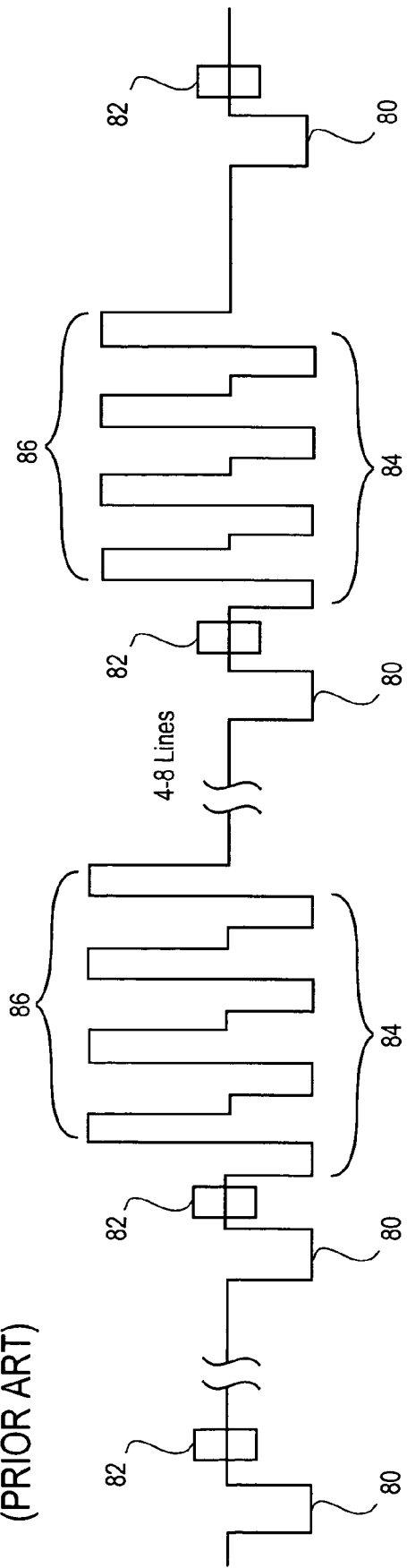
FIG. 4 illustrates a waveform of a typical video signal (NTSC standard) including copy protection signals.

Embodiments Employing Selected Reference Signal Modifications in Accordance with the Invention FIG. 4 illustrates a portion of a typical video signal with horizontal sync pulses 80 and color bursts 82, and including pseudo sync pulses 84 and AGC pulses 86 as copy protection signals. In a typical situation, the pseudo sync pulses 84 are used as a basis for a record or content control system. For example, if the pseudo sync pulses 84 are sensed by a DVD recorder, recording is prohibited. A normal sync pulse 80 is used to locate an active pixel/line area, wherein the pseudo sync and or AGC pulses reside within an active video line region. Normally, an active line gating window pulse is triggered by timing off the normal sync pulse. This gating window then allows a reader or detection circuit to detect the presence of sufficient pseudo sync and or AGC pulses to provide a basis for a record or content control system.

Figure 4A:
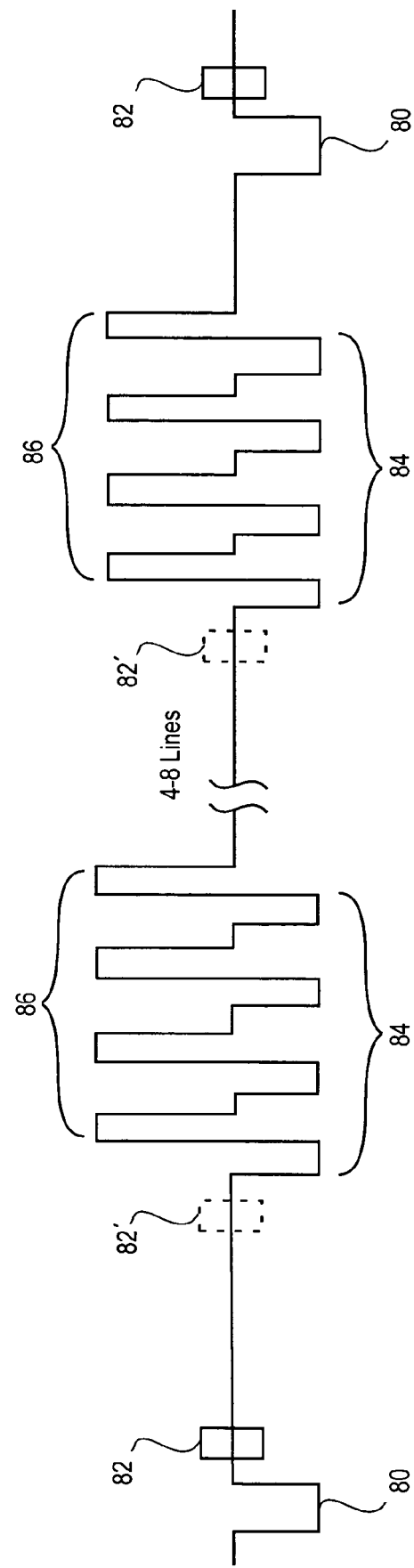

FIG. 4A illustrates a portion of a video signal which includes a modification to the video signal of FIG. 4 in accordance with the invention. In this embodiment, a selected number of horizontal sync pulses, preferably at least one of those horizontal sync pulses 80 (of FIG. 4) associated with pseudo sync pulses 84, is deleted, thereby subsequently causing a change in a content control command of a record or content control system. For example, removing some or all or the horizontal sync pulses preceding pseudo sync pulses in a selected number of video lines removes or reduces the effects of the record/copy control, which allows a DVD recorder to record the copy protected or copy control video signal and then playback a viewable picture. In at least one instance, a DVD recorder that generated the playback video signal also regenerated the missing (e.g., removed) horizontal sync pulses and or removed at least part of the copy protection signal (e.g., pseudo sync or AGC pulses).

Further, a color burst located before a pseudo sync pulse may be used as part of a sensing technique. To this end, a selected portion or all of one or more color burst may be deleted or altered (as depicted in dashed line at 82'), to thereby alter an effect of the record or content control system. It is to be understood that modifying a selected portion of a selected number of horizontal sync pulses may be sufficient to subsequently alter a content control command of a control or record control system.

Figure 4B:
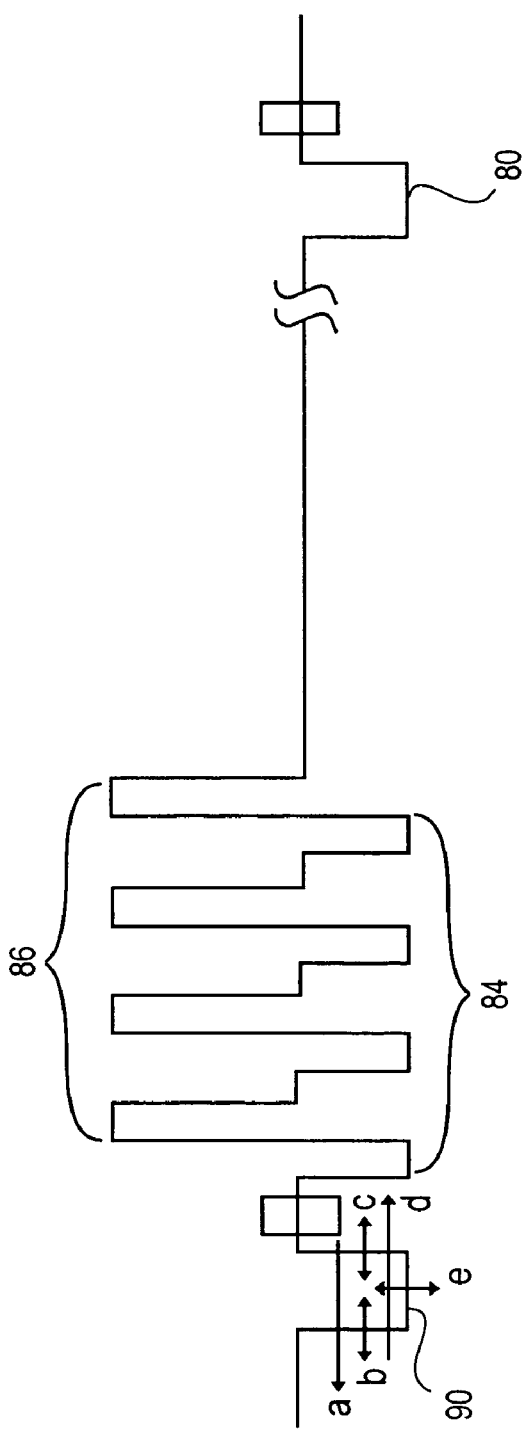

FIG. 4B is a video signal waveform illustrating an embodiment of the invention comprising a modification to a reference signal such as a horizontal sync pulse 90 and including modifying a width, a position, and or an amplitude level of at least a portion of the horizontal sync pulse 90. Sufficient modification to a reference signal, such as the horizontal sync pulse, will cause the misreading subsequently of pseudo sync pulses 84 in a record or content control system, which in turn causes the record or content control system to alter its control command. The modifications to the horizontal sync pulse include, by way of example only, selective shifting of the pulse 90. In particular arrows a and d illustrate advancing and delaying the pulse 90, while arrows b and c illustrate selective shifting of the leading and trailing edges of pulse 90 to provide shifting, narrowing or expanding the pulse duration. Arrow e illustrates increasing or decreasing an amplitude portion of the horizontal sync pulse 90. Similarly any of the modifications shown or described in FIG. 4B of a horizontal sync pulse, may be applied to at least a portion of a vertical sync signal, for example, to alter a command in a content control system.

It should be noted that the above horizontal sync modifications will not alter the copy protection effects provided by the pseudo sync pulses 84 and AGC pulses 86, but will affect the control command of a record or content control system. As previously mentioned, the record or content control system is affected because its reader (detector) circuit relies on sensing a normal sync pulse in order to "find" the pseudo sync and or AGC pulses. Also, any amplitude, pulse width and or position modification of at least a portion of one or more sync pulse (e.g., horizontal, vertical, serration, equalizing, and or header) can result in an altered control command. It should be known that alternatively, a negative going pulse prior to or after a horizontal sync pulse can alter a subsequently generated control command. For example, adding a sync or negative going pulse (of predetermined amplitude and or duration) that is detected by a content control system prior to or after a horizontal or pseudo sync pulse can lead to a change in content control command.

Figure 4C:
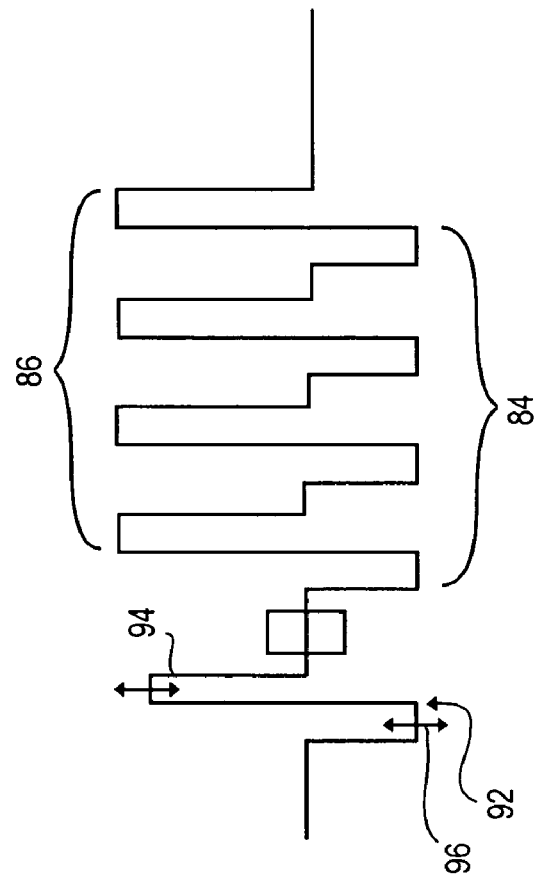

FIG. 4C is a video signal waveform illustrating an embodiment of the invention comprising a modification of a horizontal sync pulse 92, wherein a selected portion of the horizontal sync pulse 92 is altered in level. When this modification is applied to a selected set of horizontal sync pulses it causes width distortion of the set of pulses, which will alter a control command of a copy or content control system. It should be noted in this particular example that the copy protection effect is maintained or increased due to the presence of the pseudo sync and AGC pulses 84 and 86 and of the raised portion 94 of the horizontal sync pulse 92. If a leading edge of a horizontal sync pulse is detected, the narrowed horizontal sync pulse exemplified in FIG. 4C causes the content or copy control system to erroneously mis-detect a standard horizontal sync pulse that is required, for example, for correctly locating the pseudo sync and or AGC pulses 84, 86. The modification of the horizontal sync pulse 92 also may include a shift in level of a tip portion of the horizontal sync pulse 92 as depicted by the arrow at 96. Shifting the pulse tip 96 upward can cause it to evade detection in a record or content control system, which in turn changes the content control command. Shifting at least a portion of selected horizontal sync pulses will allow the horizontal sync pulses to be erroneously detected, which will cause pseudo sync pulses to miss detection for example in a record or content control environment. It should be noted that any modification to the rise and or fall time of any sync pulse also may be used to alter a control command in a record or content control system.

Figure 4D:
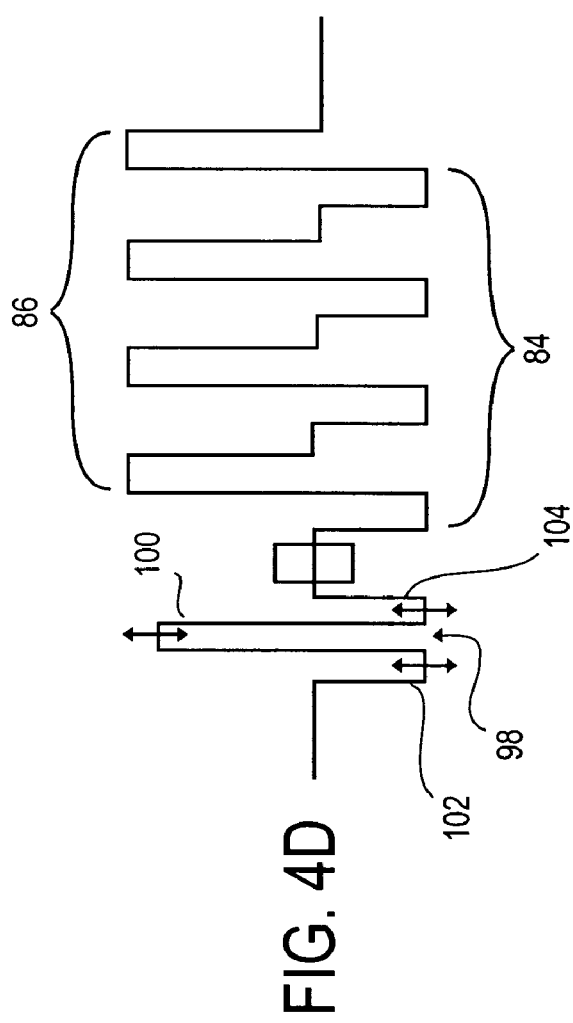

FIG. 4D is a video signal waveform of an embodiment of the invention illustrating a situation similar to the embodiment of FIG. 4C, further illustrating the partitioning of a horizontal sync pulse 98 into portions 100, 102 and or 104, combined with level shifting of the different portions of the sync pulse 98, as depicted by arrows. Such a modification of partitioning and level shifting of portions 100-104 of selected horizontal sync pulses will again cause an erroneous detection of a normal horizontal sync pulse that would normally be used to detect pseudo sync pulses or copy or content control signals. It should be noted that the copy protection effects, such as for a VCR, would be maintained by the copy protection signal or increased by the presence of horizontal sync pulse portions 100, 102. Of course, pulses 100 or 94 may be set to a voltage in the range of above blanking level to about −30 IRE, for example.

Pseudo sync pulses 84 and or AGC pulses 86, may undergo similar modifications as depicted on the H sync pulses 90, 92, 94, 96, 98, 100, and or 102 (FIGS. 4B-4D). These modifications include, on at least a portion of the pulse, level shifting, pulse-width alteration, position alteration of at least an edge, adding at least one extra edge or transition, amplitude alteration, and or frequency alteration such as multiple pulses created from a single pulse.

Figure 4E:
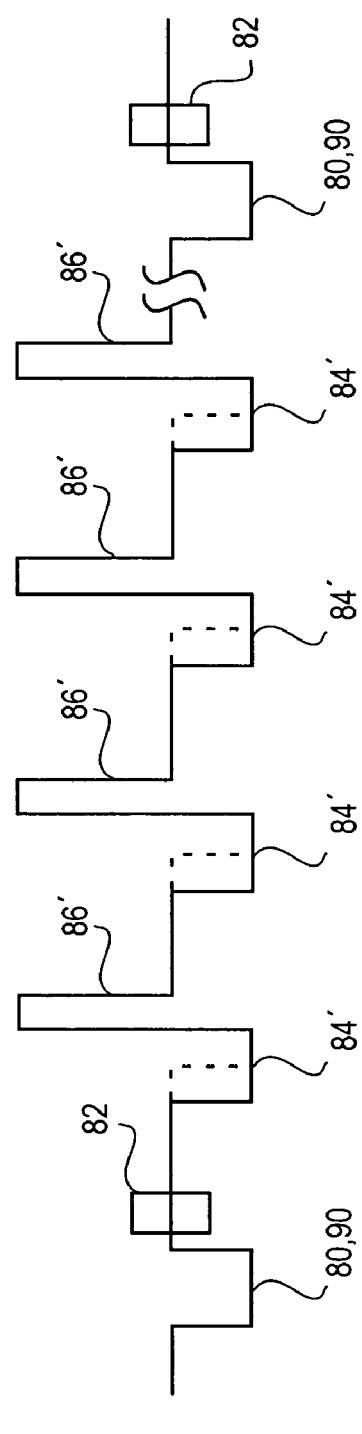

FIG. 4E depicts a video signal waveform of an embodiment illustrating various techniques for causing a change in a control command of a record or content control system. In some reader or detector circuits, the frequency of the pseudo sync pulses and or AGC pulses are set to a particular band of frequencies. If this frequency is lowered, for example, below the known frequency, as for example depicted by pseudo sync pulses 84' and AGC pulses 86' of FIG. 4E, a detector circuit will misread the presence of pseudo sync pulses which in turn will alter a command in a record or content control system. It should be noted that although FIG. 4E shows an example of lowering the frequency of the pulses, increasing the frequency also would work to alter a control command.

In an alternative to the above modification, FIG. 4E also depicts widening of the duration of at least one of the pseudo sync pulses 84'. However, it is known that, in general, detector circuits recognize that the pseudo sync width is generally narrower than a normal horizontal sync pulse width (e.g., 2.3 usec versus 4.7 usec). It follows that in the case of increasing the width of at least one of the pseudo sync pulses 84' (regardless of pseudo sync pulse frequency), a detector circuit will misread any widened pseudo sync pulse 84' as horizontal sync pulses. Accordingly, the detector circuit will fail to acknowledge that one or more of the pseudo sync pulses have been detected. Similarly increasing or decreasing the frequency of the pseudo sync and or AGC pulses can lead to an altered command in a record or content control system. Also, repositioning at least one pseudo sync or AGC pulse can lead subsequently to a change in the control command of a record or content control system. For example, repositioning a horizontal sync pulse relative to a pseudo sync pulse (or to an AGC pulse or a broadcast flag), or vice versa can lead to an altered command in a record or content control system. It should be known that widening or narrowing the pseudo sync pulses of 84 or 84' can cause an altered command to a record or content control system. For example, a widened sync pulse may be interpreted by the content control system's reader as an "ordinary" sync pulse and not a pseudo sync pulse; whereas a narrowed pulse (84 or 84') may be interpreted as a non sync pulse (by the reader). Also, as shown by dashed lines, if the pseudo sync pulse width is substantially correct in duration, but if the frequency of the pseudo sync pulses is incorrect, then an altered command may result.

It is to be understood that any of the horizontal sync pulse modifications illustrated as pulses 90-104 of FIGS. 4B-4D can be combined with the embodiments of FIG. 4E, to change accordingly the subsequent content control command of a record or content control system.

FIG. 4F is a video signal waveform of an embodiment of the invention illustrating a selective repositioning of at least one of the horizontal sync pulses as a technique for subsequently causing a reader or detector circuit of a record or content control system to misread the sync pulses. That is, to alter the control command. In this example, a repositioned horizontal sync pulse 80' follows the last pseudo sync/AGC pulse pair 84"/86". The detector circuit will then expect to sense pseudo sync pulses and or AGC pulses after the repositioned horizontal sync pulse 80', but there are none as illustrated in this example. Thus, the detector circuit will "acknowledge" that no pseudo sync pulses are detected. It should be noted that the horizontal sync pulse may be repositioned in any portion of the waveform where the pseudo sync/AGC pulses exist in order to affect the record or content control system. As before in the embodiment of FIG. 4E, the copy protection effect is maintained while the subsequent control command of the record or content control system is being altered.

FIG. 4G is a video signal waveform which illustrates a typical prior art distribution of pseudo sync pulses 110 and AGC pulses 112 that normally would be detected by a record or content control system.

FIG. 4H is a video signal waveform of an embodiment of the invention illustrating a redistribution of pseudo sync pulses 110' and AGC pulses 112' over a selected set of video lines. In this example, the number of pseudo sync/AGC pulses per video line may be different from the number in the signal of FIG. 4G, and the spacing between pulse pairs may be different as well. The redistribution of pseudo sync and or AGC pulses 110', 112' will affect, e.g., change, a control command in a record or content control system.

FIG. 4I is a data signal waveform of an embodiment of the invention illustrating a modification of a data signal 114 such as a CGMS signal, wherein one or more modifications are made to position, edge or amplitude of at least a portion of a horizontal sync pulse 116 and or a start pulse 118. By modifying at least a portion of the horizontal sync pulse 116 position, width, edge, and or amplitude as depicted by arrows a-e, the reader or detector circuit for the data signal subsequently produces an erroneous, that is, altered control command with respect to the original control command. It should be noted that the previous horizontal sync pulse modifications such as depicted by pulses 92-104 of FIGS. 4C, 4D, or 4F also may be applied here for selectively modifying the reading or detecting of the data signal 114. Also adding a negative going pulse prior to or after a horizontal sync pulse, which is sensed by the content or record system, can lead to an altered command. This negative going pulse for example may be placed prior to or after the sync pulse 116 of FIG. 4I or 80 of FIG. 4J to change a command in a content or record control system.

Further, in an alternative or combined embodiment, the start pulse 118 (start bit or start clock signal) can be at least partially modified by modifying the position, width, edge, amplitude, and or frequency of any portion of the start bit or start clock signal of the data signal 114. Here again an erroneous reading or detection will be made due to the altered control command generated by the modifying circuit 38 (FIG. 2).

FIG. 4J is a data signal waveform of an embodiment which illustrates various modifications to data 120 itself, which may include modifying at least a portion of the data 120. The modification may include position shifts as depicted by arrows k, l, or compressing or expanding at least part of the data signal time wise so as to change the frequency of at least one data bit. In addition, an amplitude variation of at least one of the data bits comprises a further modification. Any of these modifications made to the data signal 120 will alter a control command of a record or content control system.

FIG. 4K is a waveform illustrating an embodiment of the invention wherein sufficient horizontal sync pulse modifications are made to cause a content control system, in conjunction with the invention, to alter a control command such that it fails to perform its intended function. To this end, a horizontal sync pulse 121 is modified via shifting the level of any portion or portions of its sync tip (see arrows d, e, f) and or changing the position, width or edge location(s) (see arrows a, b, c). It should be known that sync pulse modifications may for example allow illegal recording. However, the process of playback may regenerate substantially normal sync pulses, thereby replacing substantially any sync pulse modifications such as those shown in FIG. 4K.

It is to be understood that the horizontal sync pulse modifications of FIG. 4K also are applicable to a content control or copy protection signal that has a modified color burst envelope; for example, a color stripe signal or a variation of a color stripe process signal. By modifying a sync pulse (or reference signal) the content control system may not detect the color stripe process or signal, thereby changing the content control command. However, upon distribution or playback on a compliant device or recorder, such as an analog to digital convertor, a digital recorder or a DVDR or PVR, the (originally modified) sync pulse (or colorburst) may be regenerated to provide a more normal sync pulse and/or more normal colorburst, which allows for a more viewable copy. That is, a modified sync pulse such as that described in FIG. 4K may cause a playability problem when the signal is supplied (e.g., directly) to a television set for display.

It should be known that adding an interfering signal or waveform, such as a predetermined, a random or a waveform signal, to at least a portion of a video signal, a sync pulse, a pseudo sync and or AGC pulse, can also alter a command in a content control system. Such an interfering signal is usually "cleaned up" by sync pulse regeneration circuits in for example a compliant device or recorder.

Figure 4L:
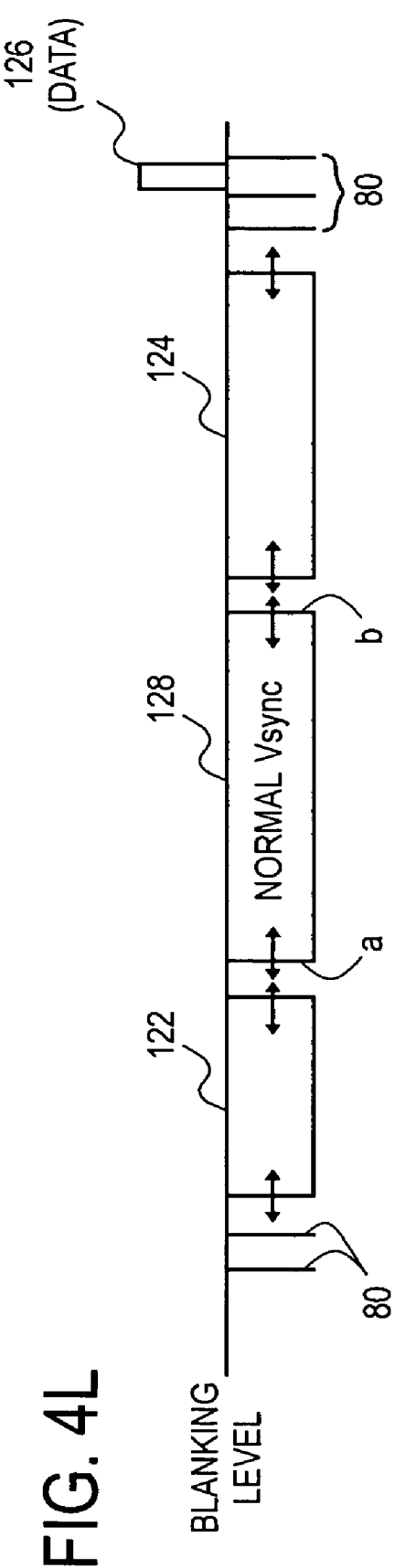

FIG. 4L shows an embodiment of the invention illustrating a technique of adding a fake vertical sync pulse or signal 122 or 124, etc, to various locations of the data signal so as to cause a false video line count for the location of the data signal 126. A normal vertical sync signal 128 without the false vertical sync signals allows for the correct reading of the data signal 126. As depicted in the FIG. 4L, the normal and or fake vertical sync signals may be position and or edge modulated to provide a false video line count and an associated altered control command in a content control system.

Figure 4M:
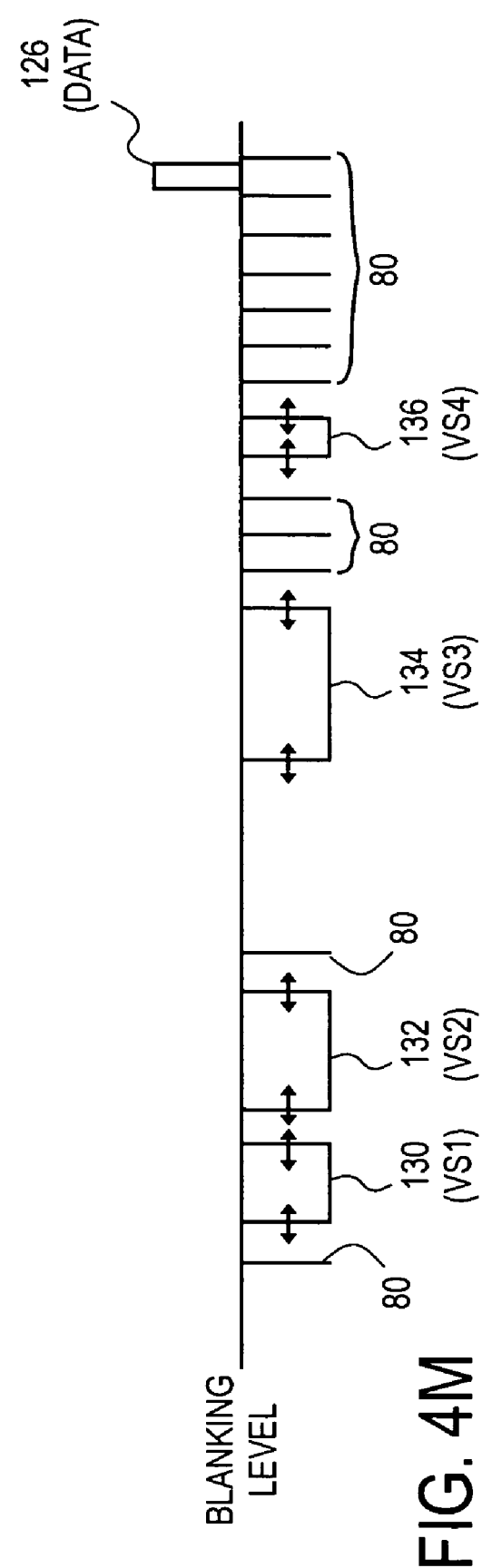

FIG. 4M is a partial data signal waveform of an embodiment of the invention illustrating further relocation examples of a vertical sync signal, wherein different locations are depicted at 130, 132, 134 and 136 and wherein each relocated vertical sync signal will cause an erroneous read or detection of the data signal 126. The original vertical signal 128 (FIG. 4L) may be at least partially removed and other vertical sync-like signals may be inserted or added so as to cause a miscount with respect to the line location when subsequently attempting to read the data signal 126.

In the FIGS. 4L and 4M, the addition of the fake vertical sync signals, or signals similar to a vertical sync signal, provides a VBI formed of more than one vertical sync-like pulse or signal. This in turn may cause playability problems if the signals are supplied directly to a television set for display. However, the reader or detector circuit in a compliant recorder or recorder control system reads the wrong data line and sees that perhaps there is no data line. This allows a recording, transmission, etc., process to occur. Subsequently, when a DVD recorder, for example, plays back the allowed recording, etc., it replaces all the added, fake, etc., vertical sync pulses or signals with clean, normal sync signals thereby allowing an acceptable viewable copy to be played back.

FIG. 4N is a waveform depicting an example of a typical video signal with a normally located vertical sync signal, wherein the first broad vertical sync pulse (at the start of video line 4) is located 17 video lines from the video line 20, which typically is the video line in which a data signal is embedded.

FIG. 4O is a waveform depicting an example of a video signal with the vertical sync signal relocated (for example, at the start of line 14) to cause misreading a data signal, which for example can be located in the typical video line 20. Because the vertical sync signal is relocated, the first broad vertical sync pulse is only 6 lines away from the video line 20 containing the data signal. It follows that the reader or detector circuit in the content control system will subsequently look for the data signal in a video line which is located 17 lines from the first (e.g., relocated) broad vertical sync pulse. Thus the content control system will fail to detect and read the data signal, which situation can represent an altered control command in a content or record control system.

At least a portion of a broad vertical sync pulse or a vertical sync signal can be modified so as to cause an erroneous "count" or "read" of a data signal for a specified line location. By altering a vertical rate/frame rate reference signal, a control command is altered for a record or content control system due to having read the wrong line. Also a new data signal can be inserted to change the control command with or without a vertical rate/frame rate signal modification. For example, the first and or second broad pulse (or any part of the vertical sync signal) can be modified (e.g., deleted, attenuated, or shifted), whereupon a new data signal optionally can then be inserted or added one and or two lines after the original data. Thus, the optionally added new data signal will be read instead of the original data, whereby an altered control command can be generated. If the new data signal is not added or inserted, the reader then skips reading the original data (e.g., CGMS) and instead reads a video line which occurs later as the data. This causes an incorrect reading resulting in an altered control command.

Embodiments Employing Color Stripe Process Modifications in Accordance with the Invention FIG. 5 illustrates a form of copy protection employing a prior art color stripe process which provides the copy protection by modifying the phase of at least a portion of a color burst 142 in selected lines of a video field. To this end, FIG. 5 depicts a crosshatched portion 144 of the color burst, which represents a modified portion (as for example by a phase shift) and an unmodified portion 146 of the color burst (un-crosshatched portion), which has substantially the correct color burst phase. The partially modified color burst 142 may be grouped on 2 or 4 consecutive video lines, followed by video lines that have substantially normal color burst phase. Thus, a particular pattern of television with a color stripe process such as depicted in FIG. 5, or other variations of modifications to the normal color burst, is used for copy protection and more recently, used for content control as in the present invention.

More particularly, the partially modified color burst 142 of FIG. 5 represents the color stripe process of previous mention, which provides at least some copy protection effectiveness with respect to an illegally copied recording, while allowing for reduced playability problems or reduced effects on a television set.

FIG. 5 also represents a method of identifying a particular type of modification for a record or content control system. The content control system may sense the color burst of selected video lines and determine whether the color burst has been modified. The content control system also may determine a pattern of video lines with the color stripe modification as means to control a system. For instance, a 2 line pattern as mentioned above may mean control command "X", but a 4 line pattern may mean control command "Y".

Thus, an original control command provided by a content control system can be altered subsequently by changing the pattern of modified color bursts in a set of selected lines of the video field. For instance, if the program material has a pattern of 2 consecutive lines of modified color burst followed by 8 lines of substantially normal color burst, then the control command can be altered by adding at least one more line of modified color burst (that is, color stripe burst) after the 2 consecutive lines mentioned above.

Of course other patterns are applicable for altering the control command of a content control system. For instance, at least one line of modified color burst can be "subtracted" (or added) from the number of lines that have the color burst modifications. As an example, a video signal with 2 or 4 line pattern may be altered to produce a 1 or 3 (or, 3 or 5) line pattern, respectively, to correspondingly change a control command of a content control system.

By way of further example, a color stripe signal detector or reader may look for 4 consecutive cycles of modified phase for the 2 or 4 line pattern. If the correct number of phase modified cycles are measured or read, and or the correct color stripe line pattern is received, then the detector or reader can generate an output indicative of color stripe presence.

For an illustration of how the exemplary color stripe reader may operate, consider that a content control signal or a copy protected signal may have a color burst which has 8 cycles of subcarrier, wherein each line may contain a color burst formed of for example either R R R R R R R R, wherein R=cycles of correct phase, or I I I I R R R R, where I=cycles of modified phase such as, for example inverted or 180 degrees phase.

To change a subsequent control command of a content control system, or to generate a new color stripe signal, the sequence of reference phase and modified phase subcarrier cycles simply can be altered. For example, the sequences R R R R I I I I or R R I I R R I I or other variants would constitute a new color stripe signal and or a change in a subsequent control command in a content control system. By way of example, other variants may include adding or subtracting a number of subcarrier cycles such as an 11 or 5 cycle sequence instead of the standard 8 or 10 cycle sequence.

Although the pattern modifications of previous mention may alter a subsequent control command of a content control system, (e.g., at least some or a part of) the copy protection effects may be maintained or strengthened. For example, adding more video lines of color stripe or color burst modification (which may alter a content control command) will usually increase the copy protection effect as seen on a television set and or VCR.

Another alternative for altering a control command provided via a content control system using for example the color stripe color burst of FIG. 5, is to relocate, via the modifying circuit 38 of FIG. 2, at least a portion of the color stripe burst envelope. For example, a selected crosshatched (phase shifted) portion and un-crosshatched (normal phase) portion of the color burst envelope can be reversed in order.

Yet another alternative for altering a control command provided by a content control system is to modify or modulate at least a portion of a color burst envelope in a selected set of television lines. The modulation may comprise phase, position, amplitude, pulse width, and or frequency modulation. The modification/modulation also may comprise the addition of a signal to a portion of the horizontal blanking interval (HBI). Such a modification may include adding or inserting at least part of a color subcarrier cycle (or a signal or waveform) of selected phase and or amplitude to a selected portion of the HBI (e.g., as to alter a command in a content control system or to alter a copy protection effect).

For example, FIGS. 5A to 5K illustrate various modifications which can be applied via the modifying circuit 38 of the invention (FIG. 2) to a color stripe signal such as the color stripe burst configuration of FIG. 5. These modifications can reduce an effect, such as, for example a copy protection effect and/or a playability effect, on a television set or a video recorder such as a VCR or the like. Further, these modifications can alter a subsequent control command or effect of a record or content control system.

Accordingly, FIG. 5A illustrates a modified color burst 142a employing a positional shift of the color stripe signal (envelope) 148 (e.g., the positional shift may include a relative (positional) shift between a sync pulse (or sync edge) and a color stripe or (modified) color burst signal. For example, a sync may shift relative to a color stripe or (modified) color burst signal). In this example, a shift or advance of at least a portion of the color stripe envelope can reduce the effect of a copy protection signal. For example, a portion of the color stripe envelope 148 is advanced to encroach into a portion of the horizontal sync pulse 80. One reason for advancing at least a portion of the color stripe envelope is that usually a television set, recorder or content control system (namely, a compliant device) will subsequently sample for color subcarrier at a selected time following the trailing edge of the associated horizontal sync pulse. By shifting at least a portion of the color stripe envelope 148, there is less hatched area to be sampled to provide a copy protection effect or for generating a correct or intended original control command.

FIG. 5B illustrates a modified color burst 142b employing a delay 150 of a sync pulse width with a color stripe envelope 152, which can result in a reduced copy protection effect on a television set or recorder, or an altered effect in the subsequently generated control command of a record or content control system. Note that the delayed horizontal sync pulse may be of a different duration than that of the original horizontal sync pulse. That is, the delayed horizontal sync pulse may be of a selected, reduced or expanded duration. A recorder or other compliant device may use the trailing edge of a horizontal sync pulse to trigger subsequent sampling. Since there is less hatched area (i.e., color stripe envelope 152) available to sense the phase shifted color stripe burst, copy protection is reduced and or the subsequent control command is altered.

FIG. 5C illustrates a modified color burst 142c employing a modification of a color stripe process comprising a wider delayed horizontal sync pulse 156 wherein at least a portion of a color stripe envelope 154 is delayed. This modification may reduce an effect of a copy protection signal on a television set or recorder, or may alter a subsequently generated control command in a record or content control system.

FIG. 5D illustrates a modified color burst 142d employing a wider horizontal sync pulse 158 with a substantially unmodified color stripe signal 160 (compare to FIG. 5). The wider horizontal sync pulse 158 allows for a reduced copy protection effect on a television set or recorder, or an altered subsequently generated control command in a record or content control system.

FIG. 5E illustrates a modified color burst 142e wherein a color stripe envelope 162 is shifted in position to substantially remove a possible detection of a modified color phase (color stripe) after a trailing edge of a horizontal sync pulse 164. For example, note that the hatched portion corresponding to the color stripe envelope 162 resides outside any portion of the back porch area. Since it is the back porch area where sampling is taken to sense a modified color burst, the modification in FIG. 5E allows for a reduced effect in a television set or recorder, or an altered subsequently generated control command in a record or content control system.

FIG. 5F illustrates a modified color burst 142F wherein a horizontal sync pulse 166 is widened to encompass a color stripe envelope 168 to substantially remove detection of the corresponding modified color burst after a trailing edge of the widened horizontal sync pulse. The widening of the horizontal sync pulse 166 causes at least a portion of the back porch area to contain for example substantial unmodified phase color subcarrier cycles. The widened sync pulse 166 thus provides for a reduced effect in a television set or recorder, or an altered control command in a record or content control system.

Figure 5G:
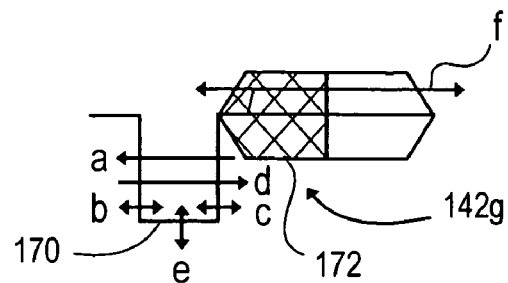

FIG. 5G illustrates a modified color burst 142g comprising a more general example of an embodiment wherein a color stripe process is modified. The modification may include modifying a portion of a horizontal sync pulse 170 in terms of position, width and or amplitude, as depicted by arrows a-e. Further, the modification may involve shifting or changing the duration of at least a portion of a color stripe envelope 172, as depicted by arrow f. For example, in FIG. 5G (or FIGS. 5H to 5K), any edge position of the sync pulse may be moved (e.g., may include any combination of position and or pulse-width variation), or any portion of the sync tip may be shifted in level. The crosshatched (or un-crosshatched) portion of the color burst may be varied in level, or the start and or end period (e.g., time) of the crosshatched (or un-crosshatched) portion may be changed (or varied). The waveform of FIG. 5G thus represents another method of reducing a copy protection effect in a television set or recorder, or of altering a subsequent control command in a record or content system. Alternatively, the modification may include changing the duration of at least one positive and or negative cycle of subcarrier (e.g., changing the duration of a cycle of the color burst).

Figure 5H:
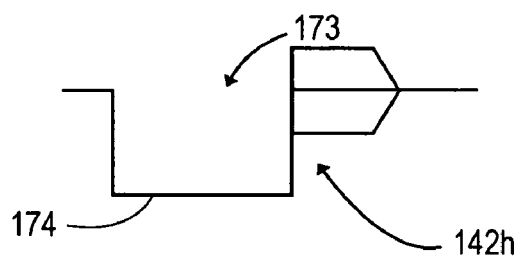

FIG. 5H illustrates a modified color burst 142h wherein a widened horizontal sync pulse 174 replaces a portion of a color stripe envelope, wherein the portion of the color stripe envelope is blanked off as at 173 to thereby remove or attenuate at least part of the color stripe signal. This also provides for reducing the copy protection effect in a television set or recorder, or for altering the control command in a record or content control system. Similarly, pulse 174 may have about a normal sync pulse width, but can be position shifted to blank off a portion of the color stripe color burst so as to for example reduce an effect of the color stripe signal or to alter a subsequent command in a record or content control system. It should be noted that widening a sync pulse, which may at least partially blank or attenuate one or more cycles of incorrect color burst phase can lead to an altered command in a content control system or a reduced effect on a copy protection signal.

In still further embodiments of the invention, it is possible to replace at least a portion of a video signal or a color stripe signal with an alternative new color stripe process, which generally changes a subsequently generated control command in a compliant device and or acts as a stand alone color stripe copy protection process.

To this end, various modifications within an HBI (or within an HBI vicinity) can lead to the alternative color stripe signal that may be more playable but may yield some unexpected increase in copy protection effectiveness. More pertinently, the alternative color stripe process may be used to alter a subsequent control command in a compliant device that is, for example, in a content control system.

Figure 5I:
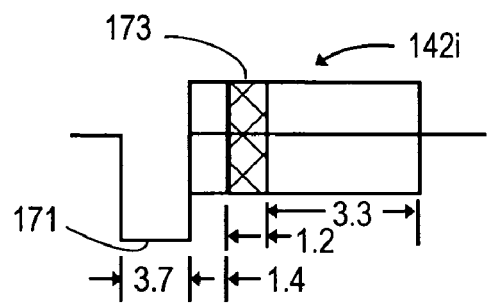
FIGS. 5I to 5K illustrate copy protection signals or signals that can modify a command in a content control system.
Figure 5J:
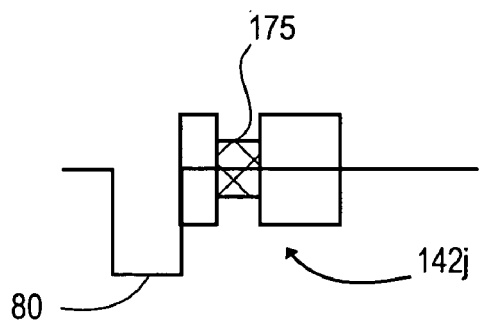
Figure 5K:
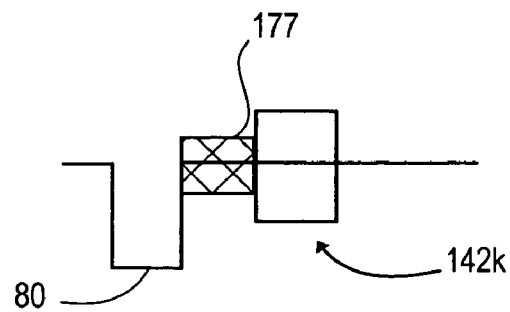

For example, FIGS. 5I, 5J or 5K illustrate a selective modification of a color burst envelope after a sync pulse and or a narrowed sync pulse, whereby a modified color burst envelope 142i, j or k can lead to a reduced playability problem in a TV set or display, while causing a copy protection effect in a recorder. Thus, the modified color burst envelope and or modified sync example of FIGS. 5I (5J or 5K) may be used as a copy protection process (e.g., via modifying a video signal or modifying a copy protection signal), or as a way for modifying a command in a content control system.

In an embodiment of the invention, FIG. 5I, a selected H sync pulse 171 is reduced in duration (e.g., from a normal 4.7 μsec to 3.7 μsec). A normal phase (e.g., 0 degree) subcarrier signal of about 1.4 μsecs is provided after the trailing edge of the narrowed sync pulse. Next, a segment 173 of about 1.2 μsecs of a predetermined phase subcarrier signal (e.g., 90 degrees, 180 degrees or other phase angle) is provided after the 1.4 μsecs of normal phase. Then following the 1.2 μsecs of predetermined phase, an expanded duration of about 3.3 μsec of normal phase subcarrier is added or inserted. The resulting color stripe signal (also termed a color burst color stripe split burst envelope or signal) then is put in selected lines or in a selected line pattern. The resulting signal can reduce playability artifacts for a copy protection process while providing at least some copy protection effect. Also, the resulting signal may be subsequently misread by a compliant device, or a record or content control system, which for instance, generates an altered control command which may allow a recordable and or playable copy to be made.

It should be noted that although the example of FIG. 5I may allow a recordable copy to be made in a content control environment, FIG. 5I may be used to synthesize a copy protection signal. For example a VCR or recorder that receives a video signal with modifications to selected blanking intervals, which may include a narrowing of sync pulses or a segmenting of normal and non normal phase cycles of subcarrier to form a color burst signal, can be used to reduce copy protection effects on a TV or display, or used for causing copy protection effects in a VCR or recorder.

In yet other embodiments, illustrated in FIGS. 5J and 5K, multiple segments of color burst of one or more subcarrier phase are inserted in the HBI (e.g., in modified burst envelopes 142j and 142k) of selected video lines. However, in addition there may be an amplitude difference among the segments. For instance one segment that has a 180 degree or non normal phase subcarrier may be reduced in amplitude relative to the other segments, such as normally phased subcarrier segments. The reduced amplitude segment with a non normal phase subcarrier has shown better playability in a television set while causing sporadic color distortion on an illegal copy upon playback (e.g., on a recorder, VCR and or display device). This sporadic color distortion of flickering is a more annoying artifact than caused by a standard color stripe process that produces a static color error in the illegal copy upon playback. That is, the flickering provides more copy protection effectiveness in VCR record and playback processes. Moreover, even greater effectiveness may be achieved by slowly modulating (e.g., amplitude and or pulse width) the reduced amplitude segment, preferably unnoticed on a display, but causing sporadic color distortion in a more annoying manner or causing the sporadic color distortion on a greater population of VCRs or recorders.

Examples of the latter embodiments include a modified color burst 142j of FIG. 5J wherein a segment of about 300 mv p-p of normal phase subcarrier is provided for 1 μsec after the trailing edge of the H sync 80, followed by a segment 175 of 1.6 μsecs of non normal phase subcarrier at about 132 mv to 160 mv p-p, then followed by a segment of 3.55 μsecs of normal phase subcarrier at about 300 mv p-p. Of course other amplitude levels of subcarrier (e.g., color burst) may be used.

In the embodiment of FIG. 5K, a modified color burst 142k contains a segment 177 of about 114 mv p-p of non normal phase subcarrier for about 1.6 μsecs following the trailing edge of the H sync 80, followed in turn by about 4.5 μsecs of normal phase subcarrier at 300 mv p-p.

It is to be understood that other time durations, orders of phase angle segments, number of segments, phase angles, and/or amplitudes may be substituted (for the values given) in the previous embodiments. Furthermore, phase, amplitude, and or pulse-width modulation is optional for any or all of the illustrated embodiments. Thus, as described in the previously mentioned paragraphs or as illustrated in FIGS. 5I, 5J, or 5K, a copy protection signal may be synthesized, for example to generate color distortions on a recording in a static or dynamic way, or may be used to alter a control command in a content or record control system.

The modifications depicted in FIG. 5G comprising sync pulse 170 *a-e* may be applied to sync pulses 80 or 171, and or color stripe or color burst, envelopes 173,142i,175,142j,177 and 142k of FIGS. 5I, 5J, and or 5K. For example the sync modifications (as illustrated in FIG. 5G) in terms of variation of width, position of either edge and amplitude may be applied to any part of the waveform or segments in FIGS. 5I to 5K. Thus, any color subcarrier segment such as depicted by envelopes 173,142i,175,142j,177 or 142k may have a modified position, for example, of either edge of a segment, width, amplitude, and or phase.

In another example, the phase as denoted in the hatched segments (which may vary in width or amplitude) of FIGS. 5G,5I, 5J, or 5K, may be time varying in a phase alternate line type of modulation. The phase then changes as a function of time. For example, the phase can change in a "swinging" manner with increased phase shift over time followed by decreased phase shift over another time interval. To illustrate, consider any of the hatched portions to start as for each successive line: +1,−1,+2,−2 . . . +89,−89 . . . +179,−179 . . . +160,−160 . . . +90,−90 . . . +2,−2,+1,−1. This "swinging" phase shift (for at least a cycle of subcarrier after a sync pulse) of increasing and/or decreasing phase values has been observed to cause color loss in an illegal copy in a dynamic manner. Thus the example above, with a swinging burst, or with a modified parameter of any portion of a segment or sync, may be used to synthesize a copy protection signal, or applied to a video signal with or without content or record control, to alter a subsequently generated control command in a content control system.

It should be noted that a non normal phase signal may include a non standard subcarrier frequency signal. For example, any of the illustrated examples in FIGS. 5A to 5K that show non normal phase can have at least one cycle of a non standard subcarrier frequency or duration. For example, the non standard frequency or duration of a subcarrier cycle or cycles may be substituted for any normal or non normal phase portion, or in combination with any normal or non normal phase portion, or may be placed in any portion of a horizontal blanking interval vicinity that can include the HBI and or a portion of the beginning or ending of an active video line. In general, a non standard subcarrier frequency or duration of at least one cycle inserted or added to a portion of the video signal may be used to alter a subsequent command of a content or record control system, or used as a copy protection signal. For example, a non standard frequency subcarrier may be added in the HBI without lowering a normal portion of the HBI.

In the FIGS. 5A to 5K, the configurations of the various color stripe signals shown is by way of illustration only. Other variations of a color stripe signal may be used with similar results. For instance, a color stripe signal that has the envelope completely or substantially crosshatched (that is, the phase substantially shifted) would still be affected by the modifications illustrated in FIGS. 5A to 5K, as disclosed in the previous associated descriptions.

It should be understood that an amplitude variation of at least a portion of a color burst/color stripe envelope of selected lines may be used to cause an erroneous reading in a record or content control system. In turn, an erroneous reading can lead to a subsequent altered control command in a record or content control system. For example, in the case of an amplitude change, a burst detector normally may require a minimum amplitude for detection. In some cases a relative amplitude between a normal phase subcarrier burst signal and a color stripe signal should be about the same. For example, both a normal burst signal and a color stripe signal should be about 300 mv peak to peak for a 1 volt video signal. If a portion of a color stripe signal or of a color burst signal is attenuated in at least one portion of the color stripe signal or color burst signal, it is possible that the record or content control system will not sense the color stripe signal properly, which may lead to an altered control command.

It should also be noted that decreasing at least a portion of a split color burst color stripe envelope may provide improved playability for a color stripe copy protection process while providing a copy protection effect in a recording. Also this copy protection effect may be unexpectedly more effective since the recording may exhibit fluctuating color reproduction upon playing back the recording. This fluctuating color playback may be caused by the VCR's or television set's color circuitry not being able to receive a color burst of sufficient amplitude for certain portions of the video (program) signal.

Thus, a process of changing (e.g., reducing or varying at least a portion of) the amplitude of a color burst color stripe split envelope (signal) and or of a color burst, may be used as at least part of a copy protection process. In an example of a color stripe system wherein the color stripe envelope in the HBI, is comprised of at least two portions of different phases, a phase shift of one or two of the phases can lead to an erroneous reading in a record or content control system. For example, a simple fixed phase shift of both phases (e.g., in a range of 0 to 360 degrees) can cause an improper reading.

In a further example, an 8 cycle color burst color stripe split burst is employed, wherein the first 4 cycles have a phase of 180 degrees followed by 4 cycles of 0 degree phase. A shift of 90 degrees would cause the first four cycles to have a phase of 90 degrees and the last 4 cycles to have a phase of 270 degrees. This shift then may be out of the normal range which would enable a record or content control reader to interpret the first and second cycles of 90 to 270 degrees as 180 and 0 degrees. Thus, an improper read of the phase of the color burst color stripe split burst would result, thereby causing an altered control command. It should then be noted that this shift as mentioned, which results in a modified color stripe envelope, may be used as a copy protection signal. For example, a color stripe envelope with two or more segments of non standard subcarrier phase for selected lines may be used as a copy protection signal or as a way to alter a control command in a content or record control system.

As mentioned, FIG. 5 depicts a prior art color stripe process. Although not shown in the figure, any portion of the portions 144 or 146, or of any normal color burst envelope, can be modified with respect to amplitude to alter a subsequently generated control command. Such a modification also results in a new color stripe process. Thus a new color stripe process can be generated by substituting a color burst envelope with phase and or amplitude variation for a selected interval or intervals. For example, at least part of the portion 144 (or 142 or 146) may be reduced (or altered) in amplitude to form a new color stripe process or to alter a subsequent control command in a content control system. One reason for the alteration is that a content control reader may require a minimum (or standard) subcarrier amplitude voltage in order to provide correct detection.

It is to be understood that such amplitude modifications to any portion of the color burst envelope or to the color subcarrier cycles (normal or non-normal phase) also are applicable to FIGS. 5A to 5H, as is described for example in FIGS. 5J and 5K.

In addition, in FIGS. 5 and 5A to 5K, the amplitude variation may be defined as a variation of energy. For example, a change in a subcarrier cycle's duty or conduction cycle, for example, positive or negative, constitutes a change in average energy. For instance, narrowing or widening (e.g., altering or changing the shape of) part of a subcarrier cycle, such as a positive or negative half cycle, amounts to a variation of energy. It should be noted that sync modifications as mentioned or illustrated for 90, 116, 184, 102, 98, 100, and or 104 may be combined in any manner to FIGS. 5 to 5K for a purpose of changing a command in a content control system or modifying an effect on a copy protection signal or synthesizing at least part of a copy protection signal.

Embodiments of Data Signal Modifications in Accordance with the Invention

FIG. 6 is a waveform illustrating a prior art data signal which can be used as a content control signal, such as a CGMS signal, in a content control system. The FIG. 6 waveform includes an H sync pulse 80, a start bit 180 and a set of data 182.

FIG. 6A is a waveform illustrating an embodiment of the invention with a data signal 182 such as shown in FIG. 6, wherein alterations are made to a horizontal sync pulse 184 or to start bit signals 180' or 180" via the modifying circuit 38 of the invention. The alterations subsequently affect a content control system, that is, alter a subsequently generated control command. For example, the start bit 180 of FIG. 6 may be relocated as shown in dashed line in FIG. 6A as 180' and or 180". Also, any portion of a horizontal sync pulse 184 may be altered in width, position, and or amplitude (see arrows a-d). It should also be noted that a sync tip and or back porch sample may be used to determine a slice point for the start and or data bits. Thus, altering at least a portion of the sync and or of a back porch portion in a set of selected lines, can generate an erroneous slice point, which in turn subsequently causes a reader circuit to read the data incorrectly. The set of selected lines for example may include any selected video lines leading up to and/or including the data signal (video line). Also varying the amplitude of a portion of a start bit or a clock reference signal can lead to an incorrect reading of data, which can cause a subsequent change in a control command of a record or content control system.

FIG. 6A thus depicts that altering the horizontal sync pulse 184 can lead to an erroneous read of a data signal. As previously mentioned, any portion of the horizontal sync signal 184 may be modified in position, width, or amplitude. Alternatively, the sync signal 184 may be replaced with the horizontal sync signal 121 illustrated in previous FIG. 4K, to provide a similarly affected result in a control command in a content control system. Alternatively, one can add at least one negative going pulse prior to or after the sync pulses 80, 184 (or 184', FIG. 6B) which can cause an altered command. By adding or inserting at least one negative going signal in the vicinity of a sync pulse that accompanies a data line, the content control system can be induced into a misread.

FIG. 6B is a waveform illustrating a prior art data signal utilizing a packet of cycles to provide a reference (clock) signal 186 which allows for reading a set of data bits 188 via an associated data reader circuit.

FIG. 6C is a waveform illustrating an embodiment of the invention wherein the reference clock signal 186 of FIG. 6B is modified via the modifying circuit 38, FIG. 2, to provide a phase shifted reference clock signal 186'. Further, modification of the horizontal sync pulse 184 as also illustrated in FIGS. 4B, 4I, 5G, etc. can affect subsequent reading of the data bits 188 or 182. Note that any portion of the reference clock signal 186' may be phase or position shifted, level shifted and or varied in amplitude to affect reading of the data bits. In addition, the data bit signal 188 or 182 also may have a portion thereof phase shifted or level shifted to thereby affect subsequent reading of the data in a content control system.

FIG. 6D is a waveform illustrating an embodiment of the invention wherein the reference clock signal 186 of FIG. 6B is modified by altering the frequency (or duration) in at least a portion of the reference clock signal to provide a modified reference clock signal 186". The modification can cause improper clocking of the data bits and lead to an erroneous or altered subsequent reading of the data signal 188'. As is depicted by pulses 186" and 188' in FIG. 6D, the amplitudes, width and frequency, etc., may be modified. As previously described, the horizontal sync pulse 184 can be position, level and/or edge shifted to provide an erroneous reading of the data bits 188'. Furthermore, changing the amplitude, frequency, spacing or duration of any portion of the set of data bits 188' can also affect (alter) the control command of a content control system.

It follows that for the waveforms illustrating in the FIGS. 6A to 6D, modulating any portion of the horizontal sync pulse, start bit, reference clock, and or data bits via for example the modifying circuit 38 of the invention illustrated in FIG. 2, can affect the output of a content control system; for instance, can change a subsequently generated control command. Such modulation or modification may comprise amplitude, phase, position, and or frequency variations. The modulating or modification may include adding a level-shifting voltage (for example, a positive and or negative voltage) to selected pixels of selected lines. For instance, the level shifting voltage may be added to at least a portion of a data television line or to a back porch/HBI region. The modification also may comprise inserting a signal in any portion or portions of the television or data signal.

Still further, it may be possible to "upset" the reading of data embedded in a television signal by adding signals in blanking portions of lines previous to and or including the data signal video line. For example, inserting or adding a negative and or positive signal in a back porch area can cause incorrect sampling of a blanking level needed to determine a proper "slice" threshold for the data signal. Similarly, modifying a portion of the selected sync amplitudes also may lead to providing an improper reference point, which in turn generates an improper "slice" voltage for subsequently reading the data signal. The modifying methods described in this paragraph such as a raised back porch pulse, or positive going pulse, or the like, are also applicable to a content control signal and would change a control command in a content or record control system. It may be noted that block 38 of FIG. 2 may include a filtering function such as a comb, band pass, band reject, low pass, or high pass filter for modifying at least a portion of the program and or content control signal. Filtering a selected portion of a signal containing a content control signal may lead to an altered command.

Embodiments of Apparatus of the Invention

Figure 7:
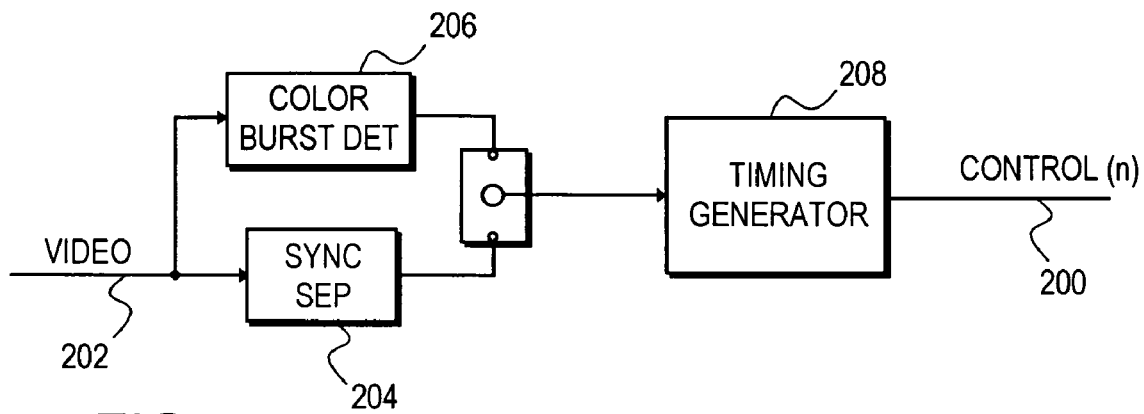
FIG. 7 is a block diagram illustrating a prior art circuit for supplying a control signal to modify various signals included in content control or copy protection systems.

FIG. 7 is a block diagram illustrating a timing circuit for outputting a control signal 200 which may be used to switch, or add a signal to, selected pixels of one or more selected video line(s). The control signal 200 also may be used for blanking selected pixels of one or more selected video line(s). To this end, a video signal on input 202 is supplied to a sync separator circuit 204 and or a color burst detector circuit 206. The output of either circuit is coupled to a timing circuit 208, which in turn generates a signal coincident with at least a (specific) portion of the video signal. The output of FIG. 7 is thus the signal 200, namely, control(n), where n represents a number of a control signal (e.g., control 1, control 2, etc.) utilized in some of the following figures.

As will become apparent, the various circuits illustrated in the following FIGS. 8-16 are examples of the various embodiments of the invention as represented by the modifying circuit 38 illustrated in FIG. 2. The circuits of each figure generate a respective modification or alteration of the program signal supplied via an input 210, corresponding to the modifications or alterations illustrated by the various waveforms shown in the FIGS. 4A through 6D. Further, although the input signal is labelled a program signal in FIGS. 8-16, it is to be understood that the signal on input 210 may comprise a data, audio or video signal containing a content control signal, a copy protection signal or a part of a copy protection signal.

Figure 8:
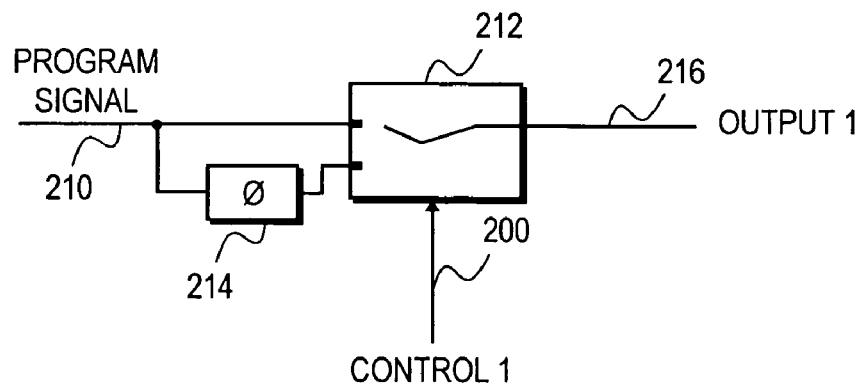
FIGS. 8 through 16 are block and/or schematic diagrams illustrating several embodiments of a modifying circuit of the invention illustrated in FIG. 2, which generate at least one or more corresponding waveforms and signals depicted in the FIGS. 4 through 6D.

FIG. 8 is a block diagram illustrating an embodiment of the invention wherein an apparatus changes the phase of a color burst or of a color stripe burst signal of a program (video) signal supplied via an input 210, during a selected portion or portions of the color burst envelope. To this end, the video signal is supplied to a phase shifter and or amplitude modifier 214 whose output is supplied to an input of a switch 212. The other input of switch 212 receives the program signal, which contains a content control signal in the form of a given color burst envelope configuration. A control 1 signal on an input 200 is supplied, as from FIG. 7, to the switch 212. Switching the switch 212 in response to the control 1 signal causes at least a portion or portions of the color burst envelope in the program signal to be modified in phase and/or amplitude via the phase shifter and or amplitude modifier 214. Switch 212 supplies the program signal with modified content control signal as an output signal 216.

By way of example, a color stripe signal may have a 2 or 4 line pattern, and the circuit of FIG. 8 may be used to form a 1 or 3 line pattern, or a 3 or 5 line pattern, etc. As a result of the change in pattern, a content control system relying on a specific color stripe line pattern, will subsequently generate a changed control command. Thus the circuit of FIG. 8 may be used to redistribute the line location of a color stripe signal, which then causes a color stripe detector to improperly sense the correct color stripe pattern. This in turn provides a detectable change in the subsequently generated control command of a content control system. The phase shifter may phase shift a selected portion(s) of a color stripe signal or substantially a whole portion. The actual phase shift may be in a range of 0 to 360-degrees. The resulting phase shift may still have a copy protection effect or a reduced copy protection effect, while changing the control command in a record or content control system.

The apparatus in FIG. 8 also may relocate the phase changes in a color stripe envelope. One example is a reverse in the location of the altered phase portion(s). For example, if a first portion of the envelope has a color stripe phase such as 180 degrees, followed by a second portion which has normal phase such as zero degree, the apparatus of FIG. 8 can reverse the order of the phases so that the first portion has a zero degree phase and the second portion has a 180 degree phase.

In terms of copy protection, there may be a little or no effect, but in terms of record or content control, there may be a substantial and thus detectable effect. By way of explanation, in some color envelope phase detectors, a minimum of 3 or more cycles of burst after the horizontal sync pulse is needed in order to read the cycles as a color stripe burst. By reversing or changing the location of the color stripe phase (e.g., 180 degrees) with normal or other phase, a color stripe detector will find that the first portion has a zero degree phase (or another phase), and that there is no color stripe signal present. Of course, other combinations of color burst and color stripe burst locations can be used.

The apparatus of FIG. 8 also may be used to change the location line assignment of at least one color stripe burst. As a result, a color stripe reader or detector may not read the correct sequence or location of a color stripe burst (pattern), and may cause a change in the subsequent control command in the record or content control system. By way of example, the change in sequence of a color stripe pattern can increase the copy protection effects on a television or VCR, while allowing copying in a record control environment. Such a change would entail for example increasing the number of lines containing the burst phase modulation over the original signal.

On the other hand, redistributing a color burst line pattern may cause a change in a control command of a record or content control system, while reducing the copy protection effects on a television or VCR/recorder. For example, a 4 or 2 line color burst signal can be redistributed to form a one line pattern. To illustrate, if there are 2 consecutive lines of color stripe followed by, for example 8 normal color burst lines, a redistribution will change the line pattern to 1 color stripe line followed by 4 normal color burst lines, which modification still provides 2 lines of color stripe for every ten lines.

In general, the apparatus or method illustrated in FIG. 8 illustrates that phase or amplitude changes may be made to a selected portion or portions of a color burst envelope in selected lines that do not have a color stripe process, so as to cause a subsequent change in the control command of a record or content control system.

Alternatively, in general, FIG. 8 illustrates apparatus or method for altering the phase (and or amplitude) of selected color stripe burst envelopes in selected portions of the envelope so as to alter the command in a record or content control system.

Figure 9:
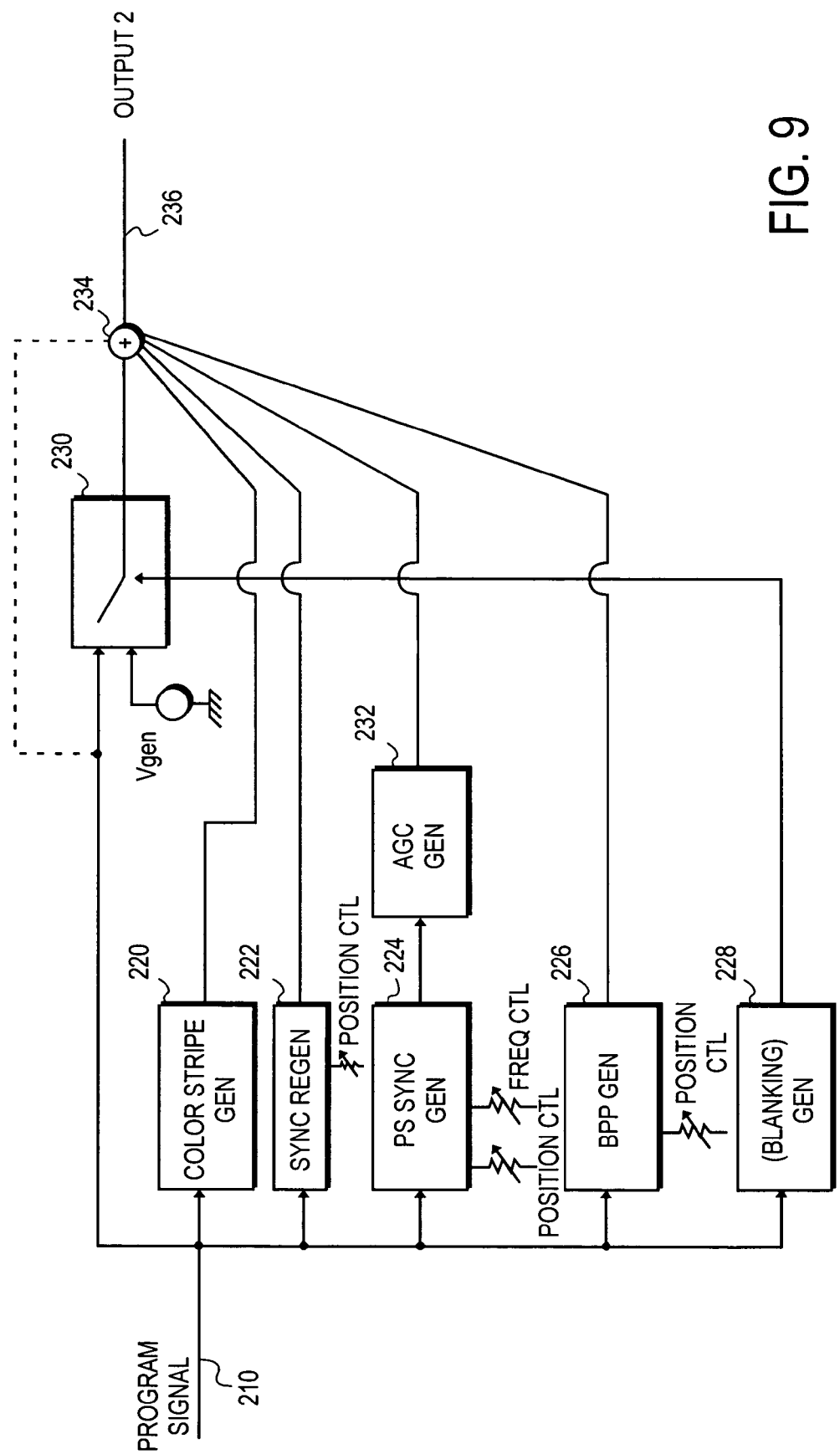

FIG. 9 illustrates embodiments of the invention for blanking or adding, inserting or replacing a certain portion or portions of the program (video) signal and then performing any of the following processes:

a) Changing the color stripe process by delaying and or advancing at least a portion of the burst envelope. For example, generating the waveforms of FIG. 5C and FIG. 5A, respectively. Also the line position, location or line pattern of the color stripe signal may be altered.

b) Changing a horizontal and or vertical sync signal position. For example, provide the waveforms of FIG. 5A or 5G, FIG. 4F or FIG. 4L, 4M, or 4O. Alternatively, changing a horizontal sync pulse width. For example, see the waveforms of FIGS. 5D, 5F, 5G, 5B (dotted line), or 5H. Further, modifying the sync pulse. For example, see the waveform of FIG. 4A wherein the horizontal sync pulse is attenuated or deleted. Or see the waveforms of FIG. 4B (sync pulse 90), FIG. 4C (sync portion 96), FIG. 4D (sync portions 102, 100 or 104), and or FIG. 4I (sync pulse 116) wherein at least a portion of the horizontal sync pulse is modified by altering its position, level, width, edges or the like. It should be noted that the vertical sync signal also may be modified in terms of position and/or level shifting, width variation, or the like.

c) Changing the position and/or repetition rate of at least a sufficient number of the pseudo sync and or AGC pulses. Note that a sufficient number of pseudo sync pulses (and or AGC pulses) may be altered in width, and this alteration may be any combination of widening and or narrowing. Also any portion of the pseudo sync and or AGC pulses may undergo level shifting. These modifications are illustrated at least in part in FIGS. 4E and 4H.

d) Changing the position of at least a back porch pulse or a pulse or signal in the HBI, wherein the change can be an advance or delay. Also, the pattern, distribution or number of back porch pulses may be altered. Ergo, the location of back porch pulses may change. In an alternative example, back porch pulses may be added, which for instance, can change a control command in a record or content control system, but still maintain or strengthen a copy protection effect in a VCR or television set. Note that any portion of a select set of back porch pulses or portion of a back porch may be level shifted.

The previously mentioned embodiments thus illustrate various methods of the invention for altering at least a subsequently generated control command in a record or content control system.

More particularly, FIG. 9 illustrates various apparatus for accomplishing the various processes illustrated in the FIGS. 4-6D. To this end, a video signal is supplied to several circuits, namely, a color stripe generator 220, a sync regenerator 222, a pseudo sync generator 224, a back porch pulse circuit 226, a blanking generator 228 and one input of a switch circuit 230.

The (e.g., blanking) generator 228 supplies a timing signal, indicative of a modified portion or portions of the video signal, to a control input of the switch circuit 230. The color stripe generator 220 modifies a color burst signal (or generates a modified color burst signal) and supplies the resulting modified color stripe burst signal (for example, a color stripe signal) to a summing circuit 234. The sync regenerator 222 supplies a selected variation of any normal (horizontal) sync pulse to a second input of the summing circuit 234. The pseudo sync generator 224 is operatively coupled to an automatic gain control (AGC) waveform generator circuit 232, whereby the generator 224 and circuit 232 provide a selected variation of pseudo sync pulses and or AGC pulses to another input of the summing circuit 234. Lastly, the back porch pulse circuit 226 provides a selected variation of a back porch to a further input of the summing circuit 234.

A second input of the switch circuit 230 is coupled to a signal source Vgen, and the output of the circuit 230 is supplied to another input of the summing circuit 234. Accordingly, blanking, replacing or adding selected pixels of selected video lines of the video signal with the Vgen signal from source Vgen is provided by the switch circuit 230 is response to the timing signal from the blanking generator 228. The output of the summing circuit 234 thus is a selected signal or combination of signals from the circuits 220-232 selectively added or inserted in the video signal on input 210.

The resulting output signal on an output 236 can be manipulated to provide a change in a record or content control system.

In one particular example of signals provided via the circuits of FIG. 9, selected H sync pulses are advanced such that there is a longer "breezeway" before the start of a color burst or a color burst modification (for example, a color stripe process which may include a color burst color stripe split burst configuration). A record or content control system may use the trailing edge of this advanced H sync modification to sense for the modified color stripe burst phase. Advancing the selected H syncs will provide a duration (for example, a long duration) with no subcarrier or color burst envelope immediately after the H sync pulse. As a result, an insufficient number of modified color burst cycles will be sensed, whereby a subsequent control command in the record or content control system will be altered (and detectable).

The method described in the above paragraph may be implemented via the apparatus in FIG. 9, wherein selected H sync pulses are replaced with an advanced sync pulse via the sync regenerator 222. Note the advanced sync pulse may include an advanced trailing edge (for example, a narrowed sync pulse wherein the trailing edge is narrowed or truncated). Also the method and or apparatus mentioned in this paragraph may be used to modify at least an effect on a copy protection signal utilizing a color burst phase modification or a color burst whose portion is modified in phase, that is, a color stripe burst portion. See the modifications in FIGS. 5B-5G.

In another example, the switch circuit 230 and voltage source Vgen of FIG. 9 illustrate a method of replacing or adding (e.g., see dotted line from input 210 to summing circuit 234) a portion of the video signal with the signal from voltage signal source Vgen. Switch circuit 230 provides the replacement or adding function thereby resulting in a modification of the video signal in response to a selected timing signal from the blanking generator 228, or a control signal such as illustrated in FIG. 7. For example, in selected video lines, a portion of the back porch region may be replaced by or added to a signal such as for example a positive or negative going voltage or a blanking voltage.

Yet another example of the invention is to narrow selected H sync pulses (e.g., narrow substantially all H sync pulses), which then makes the width of these narrowed H sync pulses similar to the duration of associated pseudo sync pulses. This narrowing example then can cause the content or record control reader to fail in reading H sync pulses prior to pseudo sync pulses, thus causing a change in a control command. Also, if the narrowed pulse has its trailing edge "advanced" then a subcarrier signal may be inserted after the narrowed sync or H sync pulse. A color stripe detector then may incorrectly detect the sync pulse because of the added subcarrier signal, and cause an altered control command. If a narrowed (H) sync pulse has a "blanked" or non subcarrier signal located after its trailing edge, a color stripe detector then may not detect the properly phased subcarrier signal, which also causes an altered control command.

Figure 10:
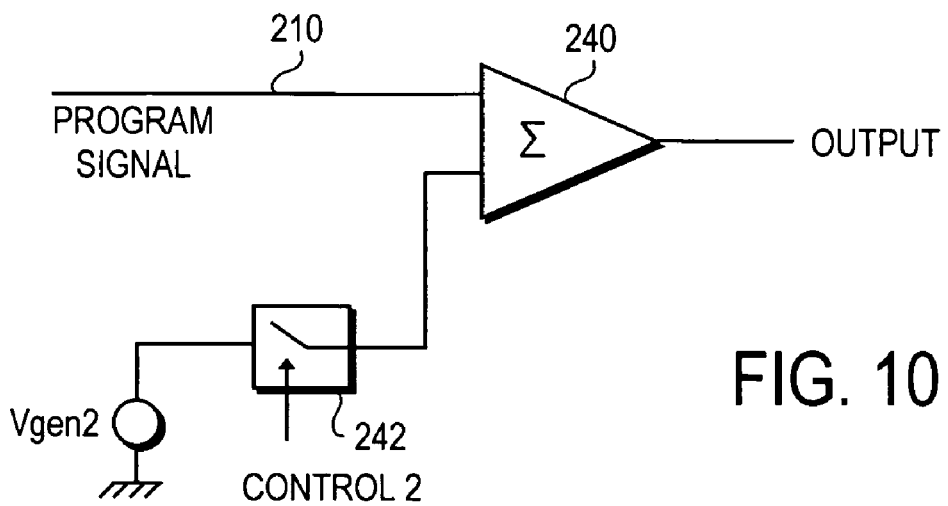

FIG. 10 illustrates an apparatus or method of the invention for adding a selected signal to a portion of the video signal supplied via input 210 to one input of a summing amplifier 240. A voltage source Vgen2 is operatively coupled to a second input of the amplifier 240 via a gating switch 242. The voltage source Vgen2 and gating switch 242 provide a signal at selected pixels of selected lines in response to a timing signal, control 2, wherein the signal is summed with the video input signal via the summing amplifier 240. For example, the signal from voltage source Vgen2 can serve as an interference signal to one or more back porch pulse, a pseudo sync and or AGC signal, a sync pulse, or a data signal. The interference signal for example may provide a change in a control command of a record or content control system. The source Vgen2 alternatively may serve as a level shifting signal voltage added to a portion of the video signal.

Figure 11:
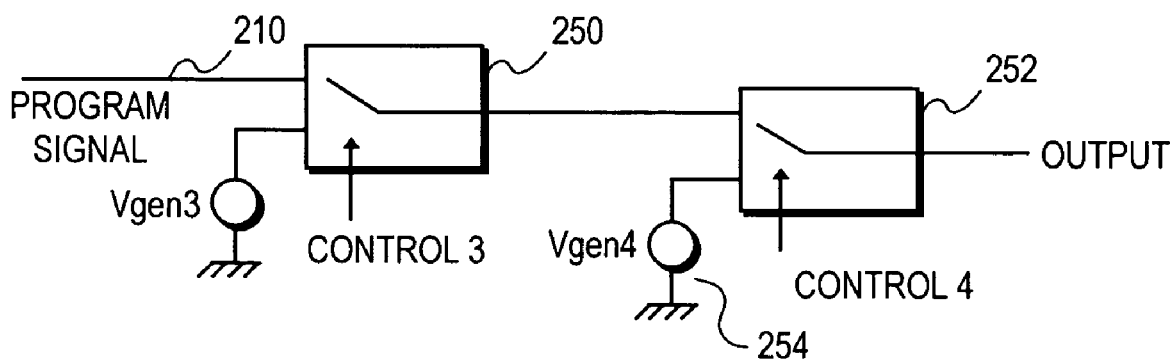

FIG. 11 is an embodiment of the invention illustrating an apparatus and method for replacing a first portion of a video signal with a voltage signal supplied via a voltage source Vgen3 and a second portion of the video signal with a second selected signal. To this end, the video signal is supplied to a switch circuit 250 whose second input is coupled to the voltage source Vgen3. The output of the switch circuit 250 is supplied to a switch circuit 252 whose second input is coupled to a signal source 254. The switch circuits 250 and 252 are controlled by timing signals control 3 and control 4, respectively. In accordance with the invention, the first and second portion may share at least a common location or pixel of the video signal. For example, the first portion of the video signal may be altered by inserting a signal from the source Vgen3 in a portion of a back porch region in selected video lines. (Vgen3 may add or insert a sync pulse or negative going signal in front of an existing sync signal.) Optionally, the second portion of the video signal may be altered by providing sync pulses and or color burst modifications in selected video lines. The sync, HBI pulse or color burst modification may include dynamic or static modulation thereof. Modulation may be of position, width, frequency and or amplitude.

Although in general, dynamic sync, sync, and or color burst modifications may cause a playability problem when the signal is displayed in a television set, a more viewable picture may be supplied by a recorder because the recorder may replace or regenerate the sync pulse and or color burst during the playing back of the video signal. In the meantime, the modifications may change the control command of a record or content control system, wherein the altered control command is such to allow a recording to be made.

Figure 12:
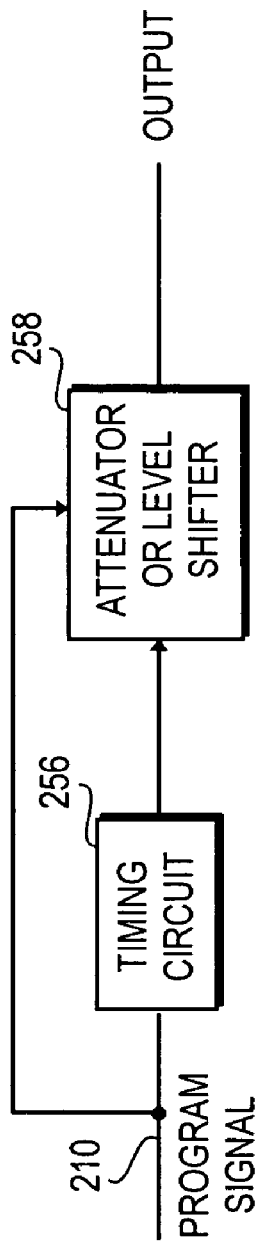

FIG. 12 is a block diagram illustrating the use of an attenuation and or level shifting process to modify a video signal in accordance with the invention, that is, to change a control command in a record or content control system. The attenuation process may include filtering such as comb, band pass, band reject, low pass, and or high pass transfer functions. The video signal is coupled to a timing circuit 256, which provides a timing (control) signal coincident with a portion or portions of a video signal. The output of the circuit 256 controls an attenuator and or level shifting circuit 258, which also is coupled to the video signal on input 210. The output of the circuit 258 provides attenuation and or level shifting of selected pixels in selected lines. For example, a portion or portions of selected color burst envelopes may be attenuated, or selected back porch portions may be raised. That is, added back porch pulses may change a reading of a control command in a content control system. On the other hand, a portion of the back porch may be lowered, wherein a lowered portion of a back porch may cause improper sensing of data signals or of raised back porch pulses used as tags. In a further alternative example, an attenuation of selected color burst envelopes may cause improper sensing of modified color bursts that are used in a record or content control system. In yet another alternative, an attenuated or level shifted portion or portions of selected sync pulses can also cause an improper reading or sensing of tags, thereby providing an altered control command in a record or content control system. It is noted that a width modification of selected sync pulse(s) also may alter a control command as well.

An obvious example of the use of the apparatus of FIG. 12 includes attenuating or level shifting a selected back porch region in selected video lines. Thus, raised back porch pulses used for content control will be affected, whereby a control command will be altered.

The circuit of FIG. 12 also illustrates that a selected portion of a data signal (e.g., a CGMS signal), may be attenuated or level shifted so as to cause an improper reading of the data signal which will cause an altered control command in a record or content control system.

Figure 13:
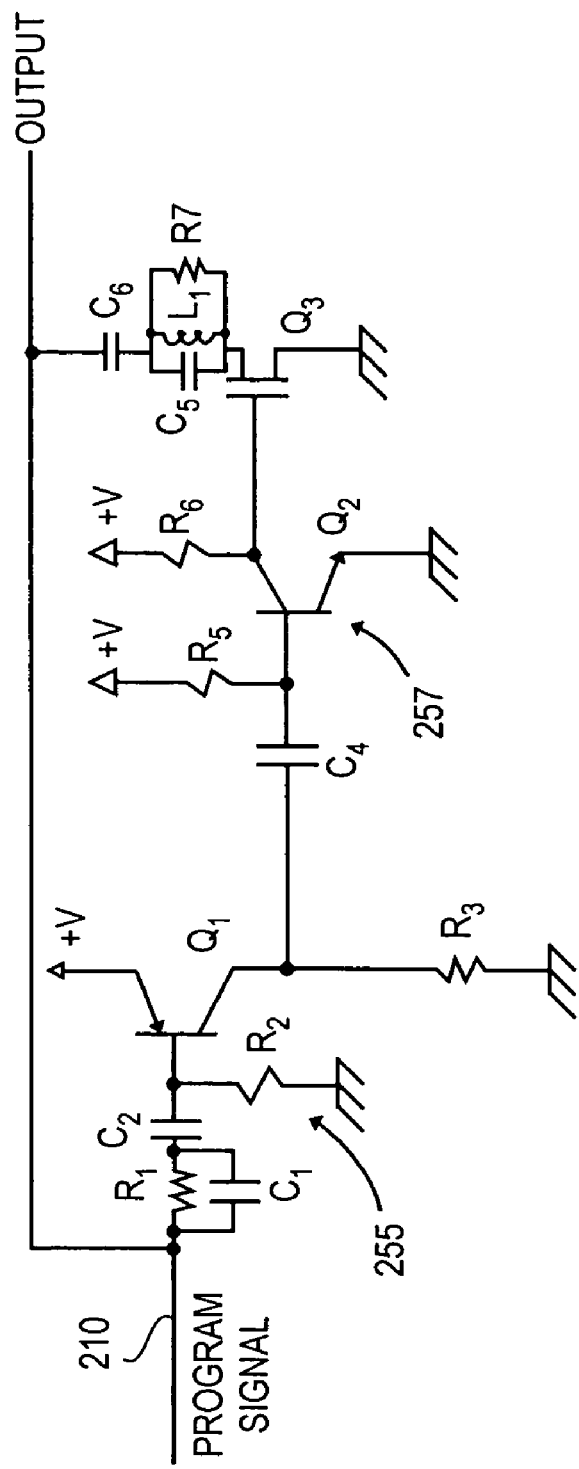

FIG. 13 illustrates a circuit in accordance with the invention, which circuit attenuates a portion of the back porch (or HBI) in selected video lines Here, a video signal is supplied on input 210 to a sync separator circuit 255 comprised of components R1,C1,C2,R2,Q1, and R3. The collector of the transistor Q1 then outputs sync pulses of opposite phase to a timing circuit 257 comprised of components C4,R5,Q2, and R6. The collector output of the transistor Q2 then is a pulse coincident with a portion of a back porch region. The output of the transistor Q2 is then coupled to a transistor or switch Q3, which at least attenuates the portion of the back porch for selected video lines. Optionally a capacitor C5 and inductor L1 may be used to ensure little or no attenuation to a color burst, but can be deleted from the circuit if attenuation of a portion of a color burst and or a portion of a back porch signal is intended. The capacitor C6 preferably is large enough to cause at least some attenuation of the video signal when the transistor Q3 is turned on. The value of resistor R7 may be selected to achieve the amount of attenuation desired, for example, sufficient attenuation of a portion of the video signal to change a control command in a record or content control system.

Figure 14:
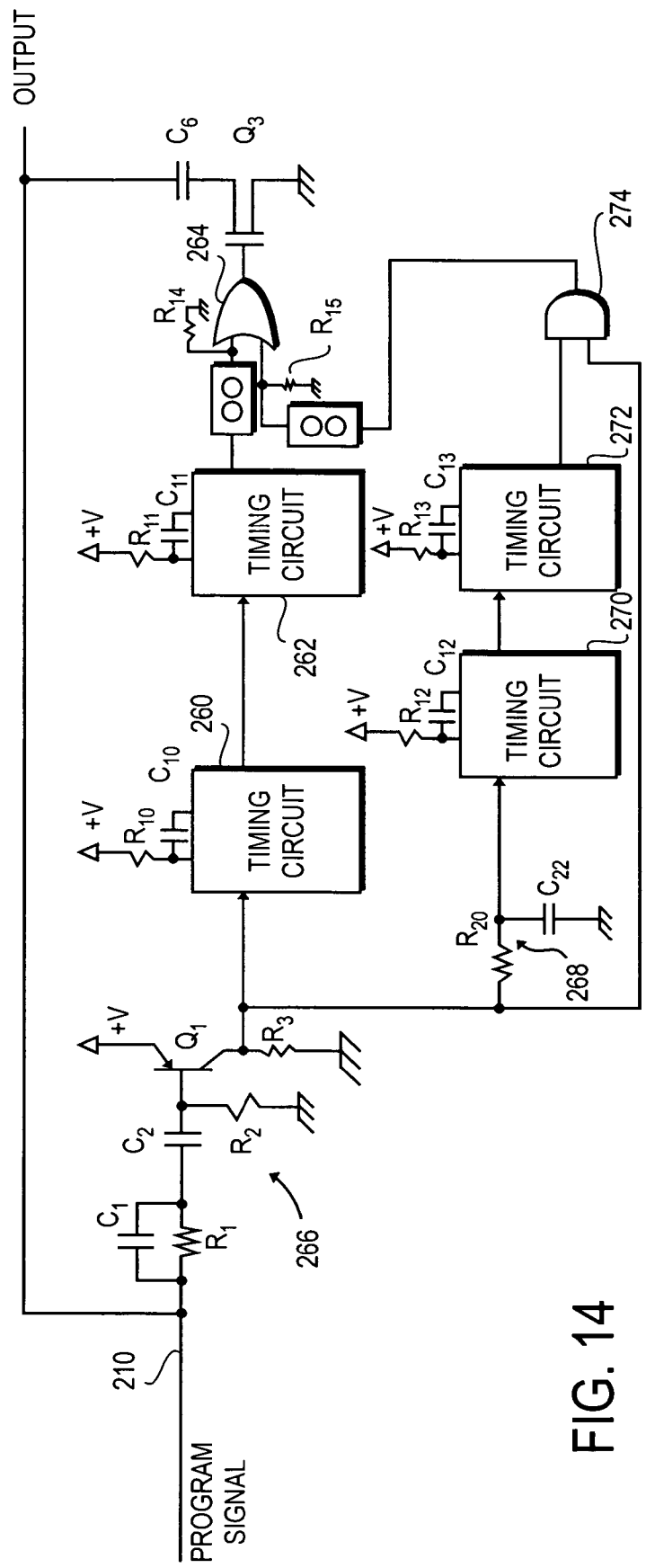

FIG. 14 illustrates an embodiment of the invention which may be used to narrow, delete or attenuate selected (e.g., portions of) sync pulses. For example, at least one H sync pulse located prior to a pseudo sync pulse may be narrowed by the timing circuits 260 and 262, OR gate 264, transistor switch Q3 and capacitor C6 from, for example, about 4.7 usecs to a narrower duration such as less than 4.0 usecs. Such narrowed H sync pulses for example may replace substantially all of the H sync pulses if desired.

More particularly, FIG. 14 includes a sync separator circuit 266 similar to that of FIG. 13, with the collector output of the transistor Q1 producing inverted sync pulses. The output of transistor Q1 is coupled to the timing circuits 260 and 262, which in turn produce a pulse coincident with selected pixels of a video line. The output of transistor Q1 also is coupled to a vertical sync separator comprised of a filter 268, which supplies a vertical pulse to timing circuits 270 and 272. Timing circuit 272 then outputs a pulse coincident with at least a part of a selected video line. That is the output of timing circuit 272 may be indicative of selected video lines. A logic circuit 274 then combines the output of the timing circuit 272 with the output of the sync separator 266 and generates a signal which will (substantially) remove, narrow or attenuate selected sync pulses.

As illustrated in FIG. 14, an embodiment of the invention removes, narrows or attenuates, sync and/or pseudo sync pulses located after a vertical sync signal in the vertical blanking interval (VBI). However, logic gate 274 may receive a modified version from the transistor Q1. That is, inserting a timing (generator) circuit such as a circuit equivalent to the timing circuits 260 or the timing circuits 260 and 262 between the collector of transistor Q1 and the second input of the logic circuit 274 may generate a pulse coincident with the HBI. The output of circuit 274 then will be used to remove or narrow only selected H sync pulses prior to pseudo sync pulses via the OR gate 264, transistor Q3 and capacitor C6. Similarly, with other logic circuits, a pulse may be generated outside the HBI to selectively narrow or attenuate at least one pseudo sync pulse.

Accordingly, OR gate 264 may provide a combination of selected narrowed H sync pulses and or selected deleted H sync pulses, for example, in the VBI or outside the VBI.

Figure 15:
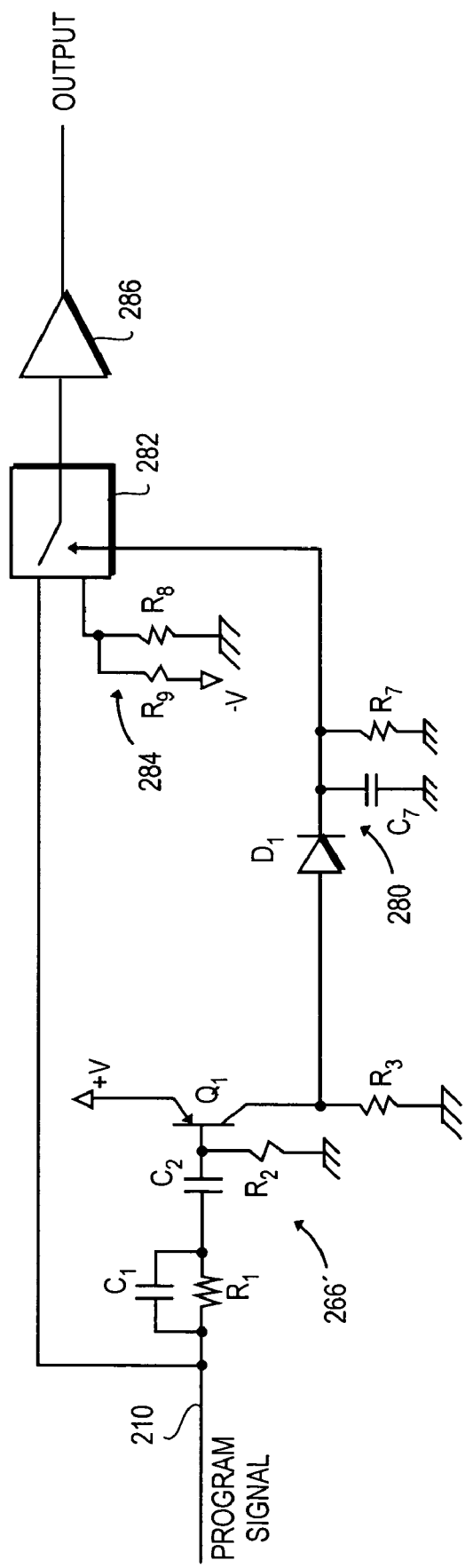

FIG. 15 illustrates another embodiment of the invention that provides a widened sync pulse, which may for example encroach into a back porch or color burst region. As a result of the wider sync pulse, e.g., wider H sync pulses, less cycles of a color stripe burst signal will be detected, whereby a control command will be changed in a record or content control system. See the modifications of FIGS. 5C, 5D, 5F, or 5G.

More particularly, FIG. 15 shows a program signal, such as a video signal with a content control signal or at least a part of a copy protection signal, coupled via input 210 to a sync separator circuit 266' similar to those of FIGS. 13 and 14. The collector output of transistor Q1 is indicative of inverted sync pulses. A peak detector/pulse stretching circuit 280 comprised of a diode D1, a capacitor C7, and a resistor R7, adds an extra duration to the end of the inverted sync pulses provided via the collector of transistor Q1. The output of the pulse stretching circuit 280 is supplied to a control input of a switch circuit 282. A second input of the switch circuit 282 is a voltage supplied by a voltage source 284 whose voltage level is about the same as the voltage level of the video signal sync tip. The other input to the switch circuit 282 receives the video signal. The output of the switch circuit 282 thus provides a replaced sync signal with longer duration. An amplifier 286 then provides a video output with a sync modification of widened sync pulse duration which can represent an altered control command.

Figure 16:
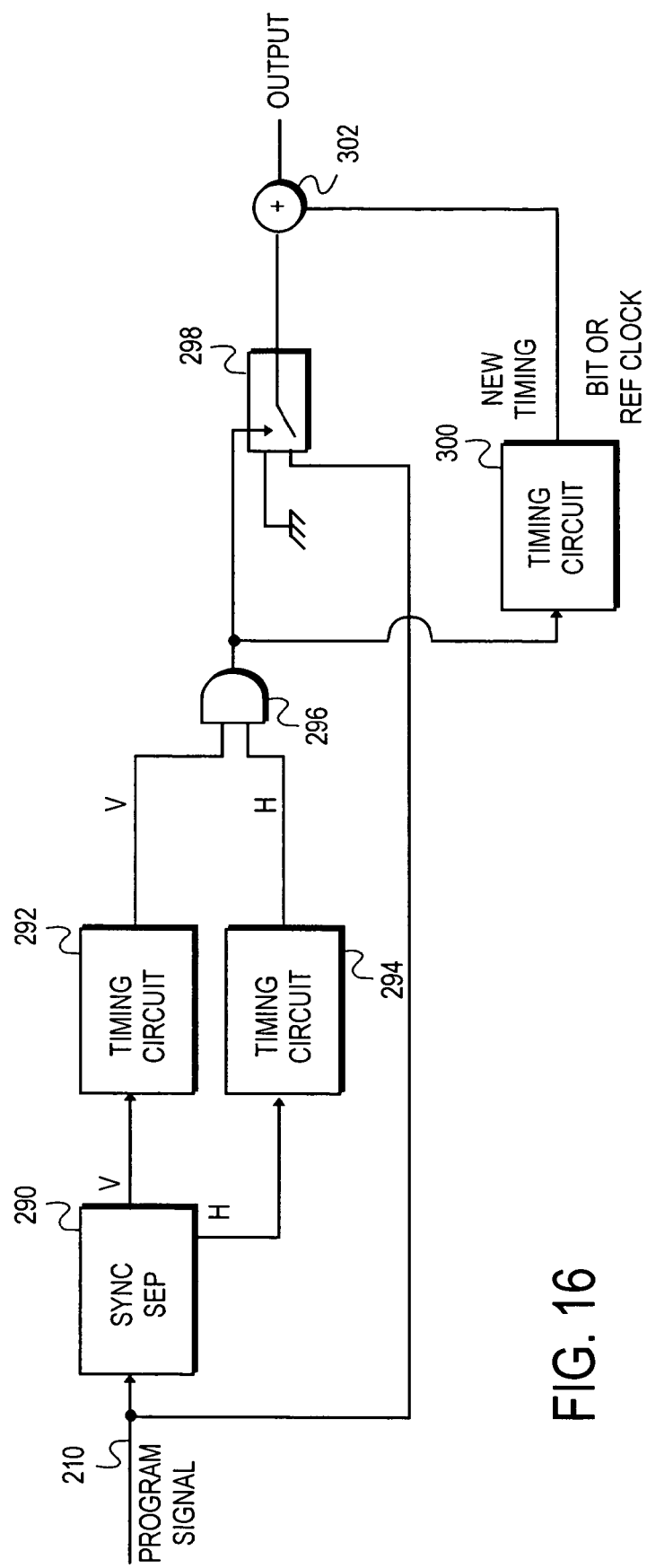

FIG. 16 illustrates yet another embodiment of the invention that provides for a modification of a data signal, such as a CGMS signal. This modification includes altering a start bit or a reference clock. See FIGS. 4I, 4J and 6A, 6D. In the simplest embodiment, a portion of the start bit or reference clock is attenuated or removed. In another embodiment, the start bit or reference clock is replaced with a signal. This signal may interfere with or replace the start bit or reference clock.

More particularly, as shown in FIG. 16, a video signal is coupled to a sync separator circuit 290 whose output comprises horizontal and vertical pulses, H and V. The vertical pulses, V, are coupled to a timing circuit 292, which supplies a signal indicative of selected video lines to an input of a logic gate 296. The horizontal pulses are coupled to a timing circuit 294 which generates a signal indicative of selected pixels. The output of the timing circuit 294 is coupled to a second input of the logic gate 296. The output of the logic gate 296 then is a signal indicative of selected pixels of selected video lines and as shown is supplied to a control input of a switch circuit 298. One input of the switch circuit 298 is coupled to ground (or to a voltage signal) and the other input is coupled to the video signal on input 210. The output of switch circuit 298 is a video signal with a portion thereof replaced with a new voltage. For example, switch circuit 298 replaces at least a portion of the start bit or reference clock of a data signal with a ground or blanking level. Note that the output of the switch circuit 298 may be used as an output signal for blanking at least a portion of the video signal as to alter a control command. For example, blanking a reference signal (or portion) such as a start bit, a clock signal, a broad (vertical sync) pulse, or a sync signal (e.g., H sync) can change a subsequently generated control command. Also blanking a portion of the content control signal may change a control command. Of course, blanking can also mean replacing or inserting a signal voltage.

In another embodiment of the invention, the switch circuit 298 may be used to blank out at least a portion of the reference signal (e.g., start bit or reference clock) while a timing circuit 300 provides a modified reference signal in place of the prior reference signal, via a summing circuit 302. For example, a modified reference signal, such as a portion thereof, may comprise a delayed or advanced start bit, or may comprise a reference clock of altered phase or frequency. It may also comprise a reference signal of a modified amplitude level.

In yet another embodiment, the video signal may be coupled to the summing circuit 302 with the switch circuit 298 disconnected from the summing circuit 302. Timing circuit 300 then provides an interference signal or added signal for combination with at least a portion of the video signal (e.g., of the reference signal).

It should be noted that a back porch as previously mentioned also includes an interval following a sync pulse. This sync pulse may be altered in width, and the interval is generally within a blanking interval, although it can be extended to an active video portion.

It is to be understood that the expressions "erroneous reading," "not sensing the color stripe signal properly," "altered effect in the content control system," etc., mean that the control command corresponding to an original content control signal has been altered to a different control command by altering the original content control signal. This in turn causes a reader/detector circuit to output a control command which is not the originally intended control command, ergo, is an "erroneous" or "unintended" control command. Furthermore, the altered control command can consist of no reading at all by the reader or detector circuit.

Although the invention has been described herein relative to specific embodiments, various additional features and advantages will be apparent from the description and drawings, and thus the scope of the invention is, defined by the following claims and their equivalents.

For example, a signal containing a watermark for a content control system may have its subsequent command altered if coring or signal processing is done prior to the content control system In another example, the watermarked signal or a (program) signal including a content control signal may be transformed (e.g., FIG. 2A modifying circuit 38) via scrambling or encoding the signal prior to a content control system, which then causes a command to be altered (e.g., allow recording, display, distribution or transmission). To retrieve the signal (e.g., program video, program audio or data) would require a descrambler or decoder (e.g., FIG. 2A decoder or descrambler 41) located after the content control system. For example, in FIG. 2A, the modifying circuit 38 may be a transformation device (e.g., in hardware and or software a scrambler or encoder) to encode a signal such as a signal with a watermark or a signal including a content control signal, and the decoder or descrambler 41 may be an "inverse" transformation device (e.g., in hardware and or software a descrambler or decoder) to recover, receive, display, etc. a program signal, which then serves as a process for altering a content control command or for circumventing a content control system.

In an example, consider a signal (e.g., video signal) that has a watermark or content control signal. If a scrambler providing for example a line shuffle, line cut rotate or pixel redistribution method is used to alter the watermarked video (or to scramble/alter the content control signal in the video signal) signal prior to a content control system, there is a good chance that the watermark (or content control signal) will not be read reliably by the reader. Thus a content control command is altered, and for example, distribution, transmission, or recording would be allowed. By simply coupling a descrambler after the content control system such as depicted in FIG. 2A, the signal (e.g., video signal) may then be distributed, transmitted, or recorded (e.g., in an unauthorized manner).

For an audio signal containing a watermark, an example comprises shifting or transforming of the spectrum with a static or dynamic carrier offset; for example, a 50 Hz to 15 KHz baseband audio signal gets transformed to a 15 KHz to 50 Hz or in general a 50 Hz+/−F1 to 15 KHz+/−F1, where F1 is a static or time varying frequency. When the audio content control system tries to read the watermark in this scrambled audio system, the message may be distorted or lost thus causing a change in a content control command. To recover the audio signal after the content control system, an audio descrambler is used, whereby unauthorized distribution, reproduction, or recording can take place. Of course, any embedded signal that is part of a content control system may undergo a transformation process to alter a control command in a content control system, and or an "inverse" transformation process to recover for example the unauthorized program, data or information for displaying, distribution, transmission, recording, or the like. The embedded signal may comprise for example a watermark, data signal, copy protection information signal, at least part of a copy protection signal that has a data signal or other signal, or the like.

Note that this transformation process (e.g., scrambling or encoding) to alter a command in a content control system, or a inverse transformation process (e.g., descrambling or decoding) to recover substantially the original signal, may be implemented in the hardware and or software domain. Also, note that the distribution of unauthorized material, for example, over wires, web, air, or the like, may be accomplished via signal transformation techniques.

Thus, all of the embodiments mentioned in the previous or subsequent paragraphs or all the embodiments illustrated in the drawings may be implemented in the software and or hardware domain.

Also, any compliant devices mentioned may include printers, appliances, or the like. For example, in a content control system, the control command can limit a user to specific pages, paragraphs, text, photos, and or graphics to be printed. Other functions or features of the printers may also be restricted via a content control command. Thus, a display device in a content control system may include a printer. Similarly, a (novel or unique) content control system may restrict information for display, transmission, and or distribution as mentioned in the printer example above.

It may be noted that the modifying methods described may include a digital filter, analog filter, or comb filter (such as to alter a command). For example, a video comb filter may utilize delay lines which can add a previous TV line to a current line (e.g., voltage wise to allow for luma or chroma separation). Such adding of two video lines can cause a data signal such as CGMS or the like (e.g., content control signal) to be corrupted since the other line will most likely add an interference signal to the data line. Also forms of filtering can distort a data signal or content control signal. For example, a frequency band reject filter or notch filter (or band pass, low pass or high pass filter) can distort a content control signal. Another modifying method or apparatus may include a dissolve (e.g., effects) or mixing amplifier, which can attenuate and or add a signal to the content control signal that subsequently causes a command change.

The invention claimed is:

1. A method implemented by a processor of altering a control command in a copy, record or content control system, wherein the copy, record, or content control system receives a program video signal including an analog copy protection signal, wherein the analog copy protection signal includes at least one pseudo sync pulse and or positive going pulse in a horizontal blanking interval, and or a color stripe burst signal, and wherein one or more portion of the analog copy protection signal provides a content control signal, the method comprising:

providing via a circuit the program video signal with a content control signal indicative of a control command for performing a subsequent intended function, wherein the program video signal is playable on a monitor; and altering via a modifying circuit at least a portion of the program video signal and/or the analog copy protection signal to cause a correspondingly altered control command to be subsequently generated by the content control system, wherein the modifying circuit selectively repositions or redistributes at least a portion of the content control signal.

2. The method of claim 1 wherein the program video signal contains reference, copy protection, content control, record control, or data signals.

3. The method of claim 2 including:

determining a location in the program video signal of the reference, copy protection, content control, record control, or data signals.

4. The method of claim 3 further including:

selectively modifying the located reference, copy protection, content control, record control, or data signals so as to alter the program video signal and/or content control signal and thus to provide the alteration of the control command.

5. The method of claim 1 wherein:

the reference signal comprises a sync or header signal contained in the program video signal; and the step of altering includes selectively modifying at least a portion of a sync or header signal to correspondingly subsequently alter the control command defined by the modified sync or header signal.

6. The method of claim 5 including:

generating a timing signal indicative of the occurrence of a sync or header signal;

providing a selected modifying signal; and adding or inserting the selected modifying signal to the program video signal in response to the timing signal, to alter accordingly the subsequently detected control command.

7. The method of claim 1 wherein the program video signal includes a color burst in selected video lines, the method comprising:

phase shifting at least a portion of a color burst to provide a selectively modified color stripe burst in one or more of the selected video lines of the program video signal.

8. The method of claim 7 wherein the modified color stripe burst is located in line patterns of 2 lines or 4 lines, wherein changing from the 2 line or 4 line pattern to a 1 line or 3 line, or a 3 line or 5 line pattern, respectively, correspondingly alters the subsequently detected control command.

9. The method of claim 7 further comprising:

reversing the location of any phase shifted portions of the color stripe burst and the color burst to correspondingly alter the subsequently detected control command.

10. The method of claim 7 wherein the modified color stripe burst is located in a given line pattern, the method including:
redistributing the given line pattern to form an alternate line pattern, to correspondingly alter the subsequently detected control command.

11. The method of claim 7 wherein the phase shifted portion or portions of an envelope of a color burst is delayed or advanced in its position in the respective video line.

12. The method of claim 7 further comprising:
reducing the amplitude of at least a portion of the phase shifted portion of the color burst to alter accordingly the control command in the one or more video lines.

13. The method of claim 12 further comprising:
amplitude, position, and or pulse width modulating the amplitude reduced portion.

14. The method of claim 13 wherein the amplitude is modified up to 20%.

15. The method of claim 13 wherein the pulse width of the amplitude reduced portion is varied from four to six cycles of subcarrier over time.

16. The method of claim 12 wherein the amplitude reduced portion occurs at the start, or within a selected region, of the phase shifted portion of the color burst.

17. The method of claim 7 further comprising:
reducing or eliminating the amplitude of at least a selected portion of the color burst in the one or more video lines to alter accordingly the control command.

18. The method of claim 1 wherein the program video signal includes a color burst in one or more selected video lines, wherein the color burst contains subcarrier cycles of normal phase in a predetermined sequence with subcarrier cycles of non normal phase, the method comprising:
altering the predetermined sequence of the normal phase and non normal phase subcarrier cycles so as to provide a subcarrier cycles sequence other than the predetermined sequence, thereby providing an altered subsequently detected control command.

19. The method of claim 1 wherein the program video signal contains horizontal and vertical sync signals, the method including:
changing the position, location, width, level, edges, and or presence of a horizontal sync signal, a vertical sync signal, a content control signal, a record control signal, and or a data signal to subsequently correspondingly alter the control command such that the altered control command fails to provide the intended function.

20. The method of claim 19 including:
advancing a horizontal sync signal to increase the interval between the sync signal and a color stripe burst so that an insufficient number of color stripe burst cycles are available for detection to correspondingly alter the control command.

21. The method of claim 1 wherein the program video signal contains pseudo sync and or automatic gain control (AGC) pulses which represent a control command for subsequently providing an intended function, the method including:
changing the position, width, level, edges and or presence of one or more pseudo sync and or AGC pulses, to subsequently correspondingly alter the control command such that the altered control command fails to provide the intended function.

22. The method of claim 1 wherein the program video signal contains back porch pulses representative of a control command for subsequently providing an intended function, the method including:
changing the position, pattern, distribution, location, presence and or number of the back porch pulses, to subsequently correspondingly alter the control command such that the altered control command fails to provide the intended function.

23. The method of claim 1 including:
generating a selected voltage signal;
providing a timing signal indicative of a portion or portions of the program video signal to be modified; and
adding to or replacing the portion or portions of the program signal with the selected voltage signal in response to the timing signal to correspondingly alter the subsequent control command.

24. The method of claim 23 wherein the portion or portions includes selected pixels, back porch pulse, pseudo sync pulse, AGC pulse, sync pulse and or data signal of one or more selected video lines.

25. The method of claim 1 including:
generating first and second selected voltage signals;
providing first and second timing signals indicative of first and second portions of the program video signal; and
inserting or adding the first and second selected voltage signals into the first and second portions in response to the first and second timing signals, respectively, to subsequently alter the control command.

26. A method implemented by a processor of modifying a subsequently generated control command in a copy, record or content control system, wherein the copy, record, or content control system receives a program video signal including an analog copy protection signal containing at least one pseudo sync pulse and or positive going pulse in a horizontal blanking interval, and or a color stripe burst signal, wherein at least part of the analog copy protection signal may include an embedded content control signal, the method comprising:
providing via a circuit the program video signal with the embedded content control signal or the at least part of the analog copy protection signal, wherein the program video signal is playable on a monitor; and
modifying via a circuit at least a portion of the content control signal and/or the at least part of the copy protection signal, to cause the subsequently generated control command to be altered and thereby fail in performing an intended function, wherein at least a portion of the content control or copy protection signal is repositioned or redistributed.

27. A method of modifying a control command in a content control system when processing a program video signal, wherein the program video signal includes an analog copy protection signal having at least one pseudo sync pulse, a positive going pulse and or a color stripe burst signal in a horizontal blanking interval, the method comprising:
providing via a circuit the program video signal with a content control signal embedded therein, wherein the program video signal is playable on a monitor; and
modifying via a circuit at least a portion of the program video signal and/or the analog copy protection signal to correspondingly alter a subsequently generated control command to preclude it from performing an intended function, wherein at least a portion of the content control signal is repositioned or redistributed.

28. Apparatus for altering a control command in a copy, record or content control system, which receives a program video signal including an analog copy protection signal having at least one pseudo sync pulse, a positive going pulse and or a color stripe burst signal in a horizontal blanking interval, the apparatus comprising:

circuitry for supplying a content control signal and for selectively outputting the content control signal with the program video signal, wherein the program video signal is playable on a monitor; and a modifying circuit responsive to the combined signals for selectively altering at least a portion of the combined signals to cause a correspondingly modified control command to be subsequently generated by the copy, record, or content control system, wherein at least a portion of the content control or copy protection signal is repositioned or redistributed.

29. The apparatus of claim 28 wherein the circuit for selectively combining includes a summing circuit.

30. The apparatus of claim 28 wherein the modifying circuit comprises:
a circuit for providing a control signal;
a shifting circuit receiving the program video signal for phase shifting or relocating at least a portion or portions of a color burst envelope therein; and
a switch receiving the program signal for combining the phase shifted or relocated portion or portions with the program video signal in response to the control signal.

31. The apparatus of claim 28 wherein the modifying circuit comprises:
a color stripe generating circuit for providing a color stripe burst or modified color stripe burst; and
a summing or inserting circuit for combining the color stripe burst or modified color stripe burst with the program video signal.

32. The apparatus of claim 28 wherein the modifying circuit comprises:
a sync regenerator circuit receiving the program signal for selectively modifying a horizontal or vertical sync signal; and
a summing or inserting circuit for combining the modified horizontal or vertical sync signal with the program video signal.

33. The apparatus of claim 28 wherein the modifying circuit comprises:
a pseudo sync generator circuit receiving the program video signal for providing a selected variation of pseudo sync pulses;
an automatic gain control (AGC) generator circuit operatively coupled to the pseudo sync generator circuit; and
a summing or inserting circuit operatively coupled to the AGC generator circuit and responsive to the pseudo sync and AGC generator circuits so as to provide a selected variation of pseudo sync pulses and or AGC pulses for combination with the program video signal.

34. The apparatus of claim 28 wherein the modifying circuit comprises:
a back porch pulse circuit receiving the program video signal for providing a selected variation of a back porch region; and
a summing or inserting circuit for combining the selectively varied back porch region with the program video signal.

35. The apparatus of claim 28 wherein the modifying circuit comprises:
a switch receiving the program video signal on a first input and coupled at a second input to a voltage source;
a timing generator receiving the program video signal and coupled at its output to a control input of the switch; and
wherein the switch switches the voltage source into the program video signal in response to the timing generator.

36. The apparatus of the claim 28 wherein the modifying circuit comprises:
a switching circuit configured to receive the program video signal and a voltage signal on respective inputs;
a summing circuit coupled to the output of the switching circuit;
a color stripe generator circuit, a sync regenerator circuit, a pseudo sync and automatic gain control generator circuit, a back porch generator circuit and a blanking generator circuit configured to receive the program signal;
wherein the blanking generator circuit supplies a control signal to the switching circuit; and
wherein an output of one or more of said circuits is combined with the output of the switching circuit via the summing circuit to provide a subsequently altered control command.

37. A method of modifying a control command in a copy, record or content control system, wherein the copy, record or content control signal receives a program video signal, wherein the program video signal is playable on a monitor, and wherein the program video signal contains an original content control signal and or at least part of an analog copy protection signal indicative of a corresponding subsequently generated original control command for performing an intended function, the method comprising:
altering via a circuit the original content control signal and or a portion of at least part of the analog copy protection signal so as to subsequently correspondingly alter the original control command such that the altered control command fails to provide the intended function of the original control command, wherein at least a portion of the content control or copy protection signal is provided with an added or inserted signal.

38. A method implemented by a processor of altering a control command in a content control system, wherein the content control system receives a program video signal including an analog copy protection signal having at least one pseudo sync pulse, a positive going pulse and or a color stripe burst signal, wherein one or more portions of the analog copy protection signal provides a content control signal, and wherein the program video signal is playable on a monitor, the method comprising:
modifying via a circuit at least a portion of the program video signal and/or the analog copy protection signal to cause a change in the control command subsequently generated, wherein at least a portion of the content control or copy protection signal is altered in level, pulse width, position, phase, or amplitude.

39. The method of claim 38 wherein the video signal includes color burst signals, comprising:
deleting or altering a selected portion of a color burst signal prior to a pseudo sync pulse to thereby alter an effect on the content control system.

40. The method of claim 38 wherein the video signal includes sync pulses, comprising:
shifting an amplitude, position and or pulse width of a selected portion or portions of a sync pulse.

41. The method of claim 40, comprising:
level shifting at least one portion of a sync pulse to provide a narrowed negative going pulse and or a positive going pulse.

42. The method of claim 41 wherein either or both negative or positive going pulse may be varied in level.

43. The method of claim 38 wherein the video signal includes one or more pseudo sync pulse, and wherein the duration of the pseudo sync pulse is altered, narrowed, and or widened.

44. The method of claim 38 wherein the video signal includes two or more pseudo sync pulses, and wherein the period between two pseudo sync pulses is altered, shortened, and or lengthened.

45. The method of claim 38 wherein the video signal includes a content control signal, a data signal, and or sync pulses, comprising:
repositioning a content control signal or a data signal or one or more sync pulses.

46. The method of claim 38 wherein the video signal includes two or more automatic gain control (AGC) pulses, and wherein the period between two AGC pulses is altered, shortened, and or lengthened.

47. The method of claim 38 wherein the video signal includes a set number of pseudo sync and or automatic gain control (AGC) pulses per television line, comprising:
modifying the set number of pseudo sync and or AGC pulses per television line.

48. The method of claim 38 wherein the video signal includes sync pulses and a data or CGMS signal on an active portion of a television line, and wherein at least a portion of a sync pulse or data or CGMS signal is modified in position, amplitude and or pulsewidth.

49. The method of claim 48 wherein the video signal includes a back porch region, comprising:
altering a portion of the back porch region.

50. The method of claim 48 including:
level shifting a sync pulse portion.

51. The method of claim 48 wherein a sync pulse is level shifted to form more than one negative going pulse, and at least one positive going pulse, and wherein either or both negative or positive going pulse may have a level change.

52. The method of claim 48 wherein the sync pulses may comprise a vertical sync signal, comprising:
modifying at least a portion of the vertical sync signal, or adding or inserting another sync signal or pulse prior to and or after the vertical sync signal.

53. The method of claim 52 comprising:
modifying the vertical sync signal by changing the duration and or position of the vertical sync signal, or by adding or inserting at least one alternative vertical sync-like pulse or sync-like signal prior to or after the vertical sync signal.

54. The method of claim 52 wherein the vertical sync signal includes serration, equalizing and or vertical sync pulses, and whereby the modification includes an amplitude, pulse width and or position alteration of at least one of the serration, equalizing and or vertical sync pulses.

55. The method of claim 52 wherein the sync pulses include a vertical sync signal and wherein the vertical sync signal includes broad vertical sync pulses, comprising:
modifying a broad vertical sync pulse so as to cause an erroneous read or count of a data signal.

56. The method of claim 38 wherein the video signal includes a vertical or frame rate signal or pulse for determining the location of a data or CGMS signal, comprising:
at least partly altering the vertical or frame rate signal to cause the data signal to be misread.

57. The method of claim 38 wherein the modification causes a data signal or a content control signal to be skipped or not read.

58. The method of claim 38 wherein the video signal includes sync pulses and a data signal comprised of a reference start bit or reference clock signal, wherein the reference start bit or reference clock signal is modified in position, duration, phase, amplitude and or frequency.

59. The method of claim 38 wherein the video signal includes sync pulses and a data signal, comprising:
modifying a sync pulse prior to the data signal or modifying an amplitude of a portion of the data signal.

60. The method of claim 38 wherein the video signal includes a data signal, sync pulses, and back porch intervals, comprising:
modifying at least one back porch in a back porch area so as to cause a misread of the data signal.

61. The method of claim 38 wherein the video signal includes a data or CGMS signal comprising a data signal and a reference clock signal, or a reference start bit, wherein at least a portion of the data bit signal is modified in position, amplitude, and or pulse width.

62. The method of claim 38 wherein the content control signal contains a modulated portion of a copy protection signal forming a dynamic copy protection signal, comprising:
modifying at least a portion of the dynamic copy protection signal with a static copy protection signal that correspondingly alters a subsequently generated control command in the content control system.

63. The method of claim 38 wherein the content control system contains at least a portion of a dynamic copy protection signal, comprising:
modulating at least a portion of the dynamic copy protection signal to alter a subsequently generated control command in a content control system.

* * * * *